US012749123B2

(12) United States Patent
Neumann

(10) Patent No.: US 12,749,123 B2
(45) Date of Patent: Sep. 29, 2026

(54) METHODS AND SYSTEMS FOR MAKING A COVERAGE DETERMINATION

(71) Applicant: KPN Innovations, LLC, Lakewood, CO (US)

(72) Inventor: Kenneth Neumann, Lakewood, CO (US)

(73) Assignee: KPN Innovations LLC, Lakewood, CO (US)

( * ) Notice: Subject to any disclaimer, the term of this patent is extended or adjusted under 35 U.S.C. 154(b) by 92 days.

(21) Appl. No.: 16/729,323

(22) Filed: Dec. 28, 2019

(65) Prior Publication Data

US 2021/0201417 A1 Jul. 1, 2021

(51) Int. Cl.

| | |
|---|---|
| ***G06Q 40/00*** | (2023.01) |
| ***G06F 18/214*** | (2023.01) |
| ***G06F 18/2431*** | (2023.01) |
| ***G06N 20/00*** | (2019.01) |
| ***G06Q 40/08*** | (2012.01) |
| ***G06V 40/20*** | (2022.01) |

(52) U.S. Cl.

CPC ......... *G06Q 40/08* (2013.01); *G06F 18/2148* (2023.01); *G06F 18/2431* (2023.01); *G06N 20/00* (2019.01); *G06V 40/20* (2022.01)

(58) Field of Classification Search

None

See application file for complete search history.

(56) References Cited

U.S. PATENT DOCUMENTS 10,282,789 B1 * 5/2019 Myers .................... G06Q 40/08
10,296,982 B1 * 5/2019 Bernico ................. G16H 30/40
2004/0236611 A1 11/2004 Bonissone et al.
2007/0118398 A1 * 5/2007 Perls ...................... G16H 10/20 600/300
2011/0178902 A1 * 7/2011 Imrey .................... G06Q 40/12 705/30
2012/0262461 A1 * 10/2012 Fisher ................... G06F 40/274 345/467
2014/0372150 A1 * 12/2014 Karle ................. G06Q 30/0631 705/4
2015/0235001 A1 * 8/2015 Fouts ..................... G06Q 10/10 705/2
2015/0254719 A1 * 9/2015 Barfield, Jr. ....... G06Q 30/0261 701/31.5
2016/0003819 A1 1/2016 Curran et al.

(Continued)

OTHER PUBLICATIONS

Cooper et al., "An evaluation of machine-learning methods for predicting pneumonia mortality"; Artificial Intelligence in Medicine: 1997.*

(Continued)

*Primary Examiner* — Olabode Akintola
(74) *Attorney, Agent, or Firm* — Caldwell LLC

(57) ABSTRACT

A system for making a coverage determination. The system includes a computing device configured to receive from a remote device a coverage request. A computing device records a user biological extraction and utilizes the user biological extraction to calculate a user effective age. A computing device determines a user behavior pattern and identifies a user danger profile. A computing device produces a user coverage that is utilized in combination with a coverage machine-learning model to output a plurality of coverage options.

16 Claims, 5 Drawing Sheets

(56) References Cited

U.S. PATENT DOCUMENTS

| | | | | |
|---|---|---|---|---|
| 2016/0125149 | A1 | 5/2016 | Abramowitz | |
| 2019/0080416 | A1 | 3/2019 | Smith et al. | |
| 2019/0156426 | A1* | 5/2019 | Drucker | G06Q 40/08 |
| 2019/0287681 | A1* | 9/2019 | Sathe | G06N 20/20 |
| 2019/0311438 | A1 | 10/2019 | Hibler et al. | |
| 2019/0318358 | A1 | 10/2019 | Chamberlain et al. | |

OTHER PUBLICATIONS

Kotsiantis et al., "Efficiency of machine learning techniques in bankrupcy Prediction" ICESAcc'05 : Jul. 2005.*

Gero, Scientists Use AI to Predict Biological Age Based on Smartphone and Wearables Data, EurekAlert! Release, Mar. 29, 2018, EurekAlert!, Moscow.

Hapon, 6 Ways Machine Learning is Changing Insurance, netguru article, Jun. 11, 2019, netguru.

* cited by examiner

METHODS AND SYSTEMS FOR MAKING A COVERAGE DETERMINATION

FIELD OF THE INVENTION

The present invention generally relates to the field of artificial intelligence. In particular, the present invention is directed to methods and systems for making a coverage determination.

BACKGROUND

Presently, coverage determinations are made with little factual evidence. Further many individuals are not rewarded for having positive behaviors and positive outcomes. There lacks an ability to utilize modifiable and non-modifiable information to generate coverage options.

SUMMARY OF THE DISCLOSURE

In an aspect, a system for making a coverage determination includes a computing device. The computing device is further configured to receive from a remote device a coverage request. The computing device is further configured to record a user biological extraction. The computing device is further configured to calculate a user effective age utilizing a user chronological age and the user biological extraction. The computing device is further configured to determine a user behavior pattern. The computing device is further configured to identify a user danger profile. The computing device is further configured to produce a user coverage profile wherein the user coverage profile further comprises the user biological extraction; the user effective age; the user behavior pattern; and the user danger profile. The computing device is further configured to select a coverage machine-learning model as a function of the coverage request. The computing device is further configured to generate the selected coverage machine-learning model wherein the coverage machine-learning model utilizes a user coverage profile as an input and outputs a plurality of coverage options. The computing device is further configured to output a plurality of coverage options as a function of generating the selected coverage machine-learning model.

In an aspect, a method of making a coverage determination includes receiving by a computing device a coverage request from a remote device. The method includes recording by the computing device a user biological extraction. The method includes calculating by the computing device a user effective age utilizing a user chronological age and the user biological extraction. The method includes determining by the computing device a user behavior pattern. The method includes identifying by the computing device a user danger profile. The method includes producing by the computing device a user coverage profile wherein the user coverage profile further comprises the user biological extraction; the user effective age; the user behavior pattern; and the user danger profile. The method includes selecting by the computing device a coverage machine-learning model as a function of the coverage request. The method includes generating by the computing device the selected coverage machine-learning model wherein the coverage machine-learning model utilizes a user coverage profile as an input and outputs a plurality of coverage options. The method includes outputting by the computing device a plurality of coverage options as a function of generating the selected coverage machine-learning model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for making a coverage determination. In an embodiment, a computing device calculates a user effective age utilizing a biological extraction. A computing device produces a user coverage profile that identifies unique attributes about a user. A computing device utilizes a coverage request to select a machine-learning model that is utilized to produce a plurality of coverage options.

Figure 1:
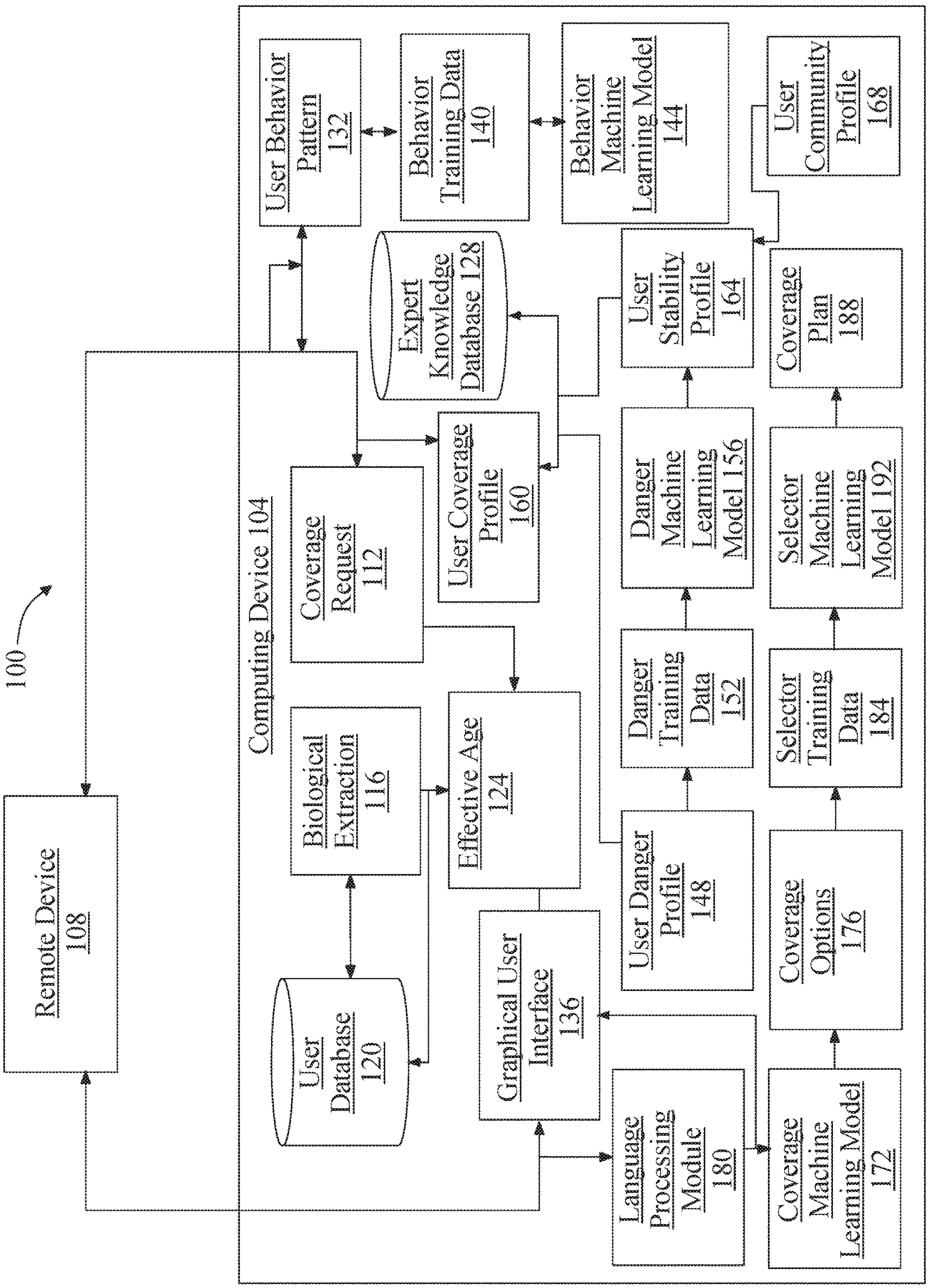
FIG. 1 is a block diagram illustrating an exemplary embodiment of a system for making a coverage determination.

Referring now to FIG. 1, an exemplary embodiment of a system 100 for making a coverage determination is illustrated. System 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices 104 in a first location and a second computing device 104 or cluster of computing devices 104 in a second location. Computing device 104 may include one or more computing devices 104 dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices 104. Computing device 104 may be implemented using a "shared nothing" architecture in which data is cached at the worker; in an embodiment, this may enable scalability of system 100 and/or computing device 104.

Still referring to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a remote device 108. Remote device 108 may include without limitation, a display in communication with computing device 104, where a display may include any display as described herein. Remote device 108 may include an additional computing device, such as a mobile device, laptop, desktop, computer and the like. Remote device 108 may be configured to transmit and/or receive one or more inputs from computing device 104 utilizing any network methodology as described herein. Computing device 104 receives from a remote device 108 a coverage request.

With continued reference to FIG. 1, a "coverage request," as used in this disclosure, is any inquiry made in order to obtain insurance coverage. "Insurance coverage," as used in this disclosure, is any means of protection from financial loss. A coverage request 112 may be generated by an insurer who provides insurance. An insurer may include for example an insurance company, an insurance carrier, and/or an insurance underwriter. A coverage request 112 may be generated by a person and/or entity who buys insurance such as an insured and/or policyholder. An insured and/or policyholder may receive a contract or insurance policy which may detail the conditions and circumstances under which the insurer will compensate the insured. An insured and/or policyholder may be charged a certain amount of money for the insurance coverage known as the premium. If an insured and/or policyholder experiences a loss which may be covered by an insurance policy, the insured and/or policyholder submits a claim to the insurer for processing by a claims adjustor for example. A coverage request 112 may specify a particular category of insurance which may include but is not limited to automobile insurance, gap insurance, health insurance, disability insurance, causality insurance, life insurance, burial insurance, property insurance, fire insurance, theft insurance, weather insurance, renter's insurance, aviation insurance, boiler insurance, builder's risk insurance, crop insurance, earthquake insurance, causality insurance, flood insurance, home insurance, landlord insurance, marine insurance, supplemental natural disaster insurance, volcano insurance, windstorm insurance, terrorism insurance, liability insurance, public liability, directors and officers liability insurance, environmental liability insurance, errors and omissions insurance, prize indemnity insurance, professional liability insurance, malpractice insurance, agricultural insurance, deposit insurance, mortgage insurance, pet insurance, reinsurance, income protection insurance, inland marine insurance, interest rate insurance, key person insurance, kidnap and ransom insurance, labor insurance, legal expenses insurance, life insurance, longevity insurance, self-insurance, travel insurance, niche insurance, no-fault insurance, over-redemption insurance, owner-controlled insurance program, parametric insurance, terminal illness insurance, tuition insurance, total permanent disability insurance, long-term care insurance, payment protection insurance, retrospectively rated insurance, worker's compensation insurance and the like.

With continued reference to FIG. 1, a coverage request 112 may contain one or more additional units of information pertaining to a user whom a coverage request 112 may pertain to. A coverage request 112 may include identifying information about a user such as a user's social security number, driver's license number, current insurance coverage policies held by a user and/or previous insurance coverage policy. Additional units of information pertaining to a user may also be included based on a particular category of insurance contained within a coverage request 112. For example, a coverage request 112 for automobile insurance may contain additional units of information such as a user's current make and model automobile, number of miles driven in the automobile each year, number of accidents each year, and the like.

With continued reference to FIG. 1, computing device 104 is configured to record a user biological extraction 116. A "biological extraction" as used in this disclosure includes at least an element of user physiological data. As used in this disclosure, "physiological data" is any data indicative of a person's physiological state; physiological state may be evaluated with regard to one or more measures of health of a person's body, one or more systems within a person's body such as a circulatory system, a digestive system, a nervous system, or the like, one or more organs within a person's body, and/or any other subdivision of a person's body useful for diagnostic or prognostic purposes. For instance, and without limitation, a particular set of biomarkers, test results, and/or biochemical information may be recognized in a given medical field as useful for identifying various disease conditions or prognoses within a relevant field. As a non-limiting example, and without limitation, physiological data describing red blood cells, such as red blood cell count, hemoglobin levels, hematocrit, mean corpuscular volume, mean corpuscular hemoglobin, and/or mean corpuscular hemoglobin concentration may be recognized as useful for identifying various conditions such as dehydration, high testosterone, nutrient deficiencies, kidney dysfunction, chronic inflammation, anemia, and/or blood loss.

With continued reference to FIG. 1, physiological state data may include, without limitation, hematological data, such as red blood cell count, which may include a total number of red blood cells in a person's blood and/or in a blood sample, hemoglobin levels, hematocrit representing a percentage of blood in a person and/or sample that is composed of red blood cells, mean corpuscular volume, which may be an estimate of the average red blood cell size, mean corpuscular hemoglobin, which may measure average weight of hemoglobin per red blood cell, mean corpuscular hemoglobin concentration, which may measure an average concentration of hemoglobin in red blood cells, platelet count, mean platelet volume which may measure the average size of platelets, red blood cell distribution width, which measures variation in red blood cell size, absolute neutrophils, which measures the number of neutrophil white blood cells, absolute quantities of lymphocytes such as B-cells, T-cells, Natural Killer Cells, and the like, absolute numbers of monocytes including macrophage precursors, absolute numbers of eosinophils, and/or absolute counts of basophils. Physiological state data may include, without limitation, immune function data such as Interleukine-6 (IL-6), TNF-alpha, systemic inflammatory cytokines, and the like.

Continuing to refer to FIG. 1, physiological state data may include, without limitation, data describing blood-born lipids, including total cholesterol levels, high-density lipoprotein (HDL) cholesterol levels, low-density lipoprotein (LDL) cholesterol levels, very low-density lipoprotein (VLDL) cholesterol levels, levels of triglycerides, and/or any other quantity of any blood-born lipid or lipid-containing substance. Physiological state data may include measures of glucose metabolism such as fasting glucose levels and/or hemoglobin A1-C(HbA1c) levels. Physiological state data may include, without limitation, one or more measures associated with endocrine function, such as without limitation, quantities of dehydroepiandrosterone (DHEAS), DHEA-Sulfate, quantities of cortisol, ratio of DHEAS to cortisol, quantities of testosterone quantities of estrogen, quantities of growth hormone (GH), insulin-like growth factor 1 (IGF-1), quantities of adipokines such as adiponectin, leptin, and/or ghrelin, quantities of somatostatin, progesterone, or the like. Physiological state data may include measures of estimated glomerular filtration rate (eGFR). Physiological state data may include quantities of C-reactive protein, estradiol, ferritin, folate, homocysteine, prostate-specific Ag, thyroid-stimulating hormone, vitamin D, 25 hydroxy, blood urea nitrogen, creatinine, sodium, potassium, chloride, carbon dioxide, uric acid, albumin, globulin, calcium, phosphorus, alkaline phosphatase, alanine amino transferase, aspartate amino transferase, lactate dehydrogenase (LDH), bilirubin, gamma-glutamyl transferase (GGT), iron, and/or total iron binding capacity (TIBC), or the like. Physiological state data may include antinuclear antibody levels. Physiological state data may include aluminum levels. Physiological state data may include arsenic levels. Physiological state data may include levels of fibrinogen, plasma cystatin C, and/or brain natriuretic peptide.

Continuing to refer to FIG. 1, physiological state data may include measures of lung function such as forced expiratory volume, one second (FEV-1) which measures how much air can be exhaled in one second following a deep inhalation, forced vital capacity (FVC), which measures the volume of air that may be contained in the lungs. Physiological state data may include a measurement blood pressure, including without limitation systolic and diastolic blood pressure. Physiological state data may include a measure of waist circumference. Physiological state data may include body mass index (BMI). Physiological state data may include one or more measures of bone mass and/or density such as dual-energy x-ray absorptiometry. Physiological state data may include one or more measures of muscle mass. Physiological state data may include one or more measures of physical capability such as without limitation measures of grip strength, evaluations of standing balance, evaluations of gait speed, pegboard tests, timed up and go tests, and/or chair rising tests.

Still viewing FIG. 1, physiological state data may include one or more measures of cognitive function, including without limitation Rey auditory verbal learning test results, California verbal learning test results, NIH toolbox picture sequence memory test, Digital symbol coding evaluations, and/or Verbal fluency evaluations. Physiological state data may include one or more evaluations of sensory ability, including measures of audition, vision, olfaction, gustation, vestibular function and pain.

Continuing to refer to FIG. 1, physiological state data may include psychological data. Psychological data may include any data generated using psychological, neuro-psychological, and/or cognitive evaluations, as well as diagnostic screening tests, personality tests, personal compatibility tests, or the like; such data may include, without limitation, numerical score data entered by an evaluating professional and/or by a subject performing a self-test such as a computerized questionnaire. Psychological data may include textual, video, or image data describing testing, analysis, and/or conclusions entered by a medical professional such as without limitation a psychologist, psychiatrist, psychotherapist, social worker, a medical doctor, or the like. Psychological data may include data gathered from user interactions with persons, documents, and/or computing devices; for instance, user patterns of purchases, including electronic purchases, communication such as via chat-rooms or the like, any textual, image, video, and/or data produced by the subject, any textual image, video and/or other data depicting and/or describing the subject, or the like. Any psychological data and/or data used to generate psychological data may be analyzed using machine-learning and/or language processing module 180 as described in this disclosure.

Still referring to FIG. 1, physiological state data may include genomic data, including deoxyribonucleic acid (DNA) samples and/or sequences, such as without limitation DNA sequences contained in one or more chromosomes in human cells. Genomic data may include, without limitation, ribonucleic acid (RNA) samples and/or sequences, such as samples and/or sequences of messenger RNA (mRNA) or the like taken from human cells. Genetic data may include telomere lengths. Genomic data may include epigenetic data including data describing one or more states of methylation of genetic material. Physiological state data may include proteomic data, which as used herein is data describing all proteins produced and/or modified by an organism, colony of organisms, or system of organisms, and/or a subset thereof. Physiological state data may include data concerning a microbiome of a person, which as used herein includes any data describing any microorganism and/or combination of microorganisms living on or within a person, including without limitation biomarkers, genomic data, proteomic data, and/or any other metabolic or biochemical data useful for analysis of the effect of such microorganisms on other physiological state data of a person, as described in further detail below.

With continuing reference to FIG. 1, physiological state data may include one or more user-entered descriptions of a person's physiological state. One or more user-entered descriptions may include, without limitation, user descriptions of symptoms, which may include without limitation current or past physical, psychological, perceptual, and/or neurological symptoms, user descriptions of current or past physical, emotional, and/or psychological problems and/or concerns, user descriptions of past or current treatments, including therapies, nutritional regimens, exercise regimens, pharmaceuticals or the like, or any other user-entered data that a user may provide to a medical professional when seeking treatment and/or evaluation, and/or in response to medical intake papers, questionnaires, questions from medical professionals, or the like. Physiological state data may include any physiological state data, as described above, describing any multicellular organism living in or on a person including any parasitic and/or symbiotic organisms living in or on the persons; non-limiting examples may include mites, nematodes, flatworms, or the like. Examples of physiological state data described in this disclosure are presented for illustrative purposes only and are not meant to be exhaustive.

With continued reference to FIG. 1, physiological data may include, without limitation any result of any medical test, physiological assessment, cognitive assessment, psychological assessment, or the like. System 100 may receive at least a physiological data from one or more other devices after performance; system 100 may alternatively or additionally perform one or more assessments and/or tests to obtain at least a physiological data, and/or one or more portions thereof, on system 100. For instance, at least physiological data may include or more entries by a user in a form or similar graphical user interface object; one or more entries may include, without limitation, user responses to questions on a psychological, behavioral, personality, or cognitive test. For instance, at least a server 104 may present to user a set of assessment questions designed or intended to evaluate a current state of mind of the user, a current psychological state of the user, a personality trait of the user, or the like; at least a server 104 may provide user-entered responses to such questions directly as at least a physiological data and/or may perform one or more calculations or other algorithms to derive a score or other result of an assessment as specified by one or more testing protocols, such as automated calculation of a Stanford-Binet and/or Wechsler scale for IQ testing, a personality test scoring such as a Myers-Briggs test protocol, or other assessments that may occur to persons skilled in the art upon reviewing the entirety of this disclosure.

With continued reference to FIG. 1, assessment and/or self-assessment data, and/or automated or other assessment results, obtained from a third-party device; third-party device may include, without limitation, a server or other device (not shown) that performs automated cognitive, psychological, behavioral, personality, or other assessments. Third-party device may include a device operated by an informed advisor. An informed advisor may include any medical professional who may assist and/or participate in the medical treatment of a user. An informed advisor may include a medical doctor, nurse, physician assistant, pharmacist, yoga instructor, nutritionist, spiritual healer, meditation teacher, fitness coach, health coach, life coach, and the like.

With continued reference to FIG. 1, physiological data may include data describing one or more test results, including results of mobility tests, stress tests, dexterity tests, endocrinal tests, genetic tests, and/or electromyographic tests, biopsies, radiological tests, genetic tests, and/or sensory tests. Persons skilled in the art, upon reviewing the entirety of this disclosure, will be aware of various additional examples of at least a physiological sample consistent with this disclosure.

With continued reference to FIG. 1, physiological data may include one or more user body measurements. A "user body measurement" as used in this disclosure, includes a measurable indicator of the severity, absence, and/or presence of a disease state. A "disease state" as used in this disclosure, includes any harmful deviation from the normal structural and/or function state of a human being. A disease state may include any medical condition and may be associated with specific symptoms and signs. A disease state may be classified into different types including infectious diseases, deficiency diseases, hereditary diseases, and/or physiological diseases. For instance and without limitation, internal dysfunction of the immune system may produce a variety of different diseases including immunodeficiency, hypersensitivity, allergies, and/or autoimmune disorders.

With continued reference to FIG. 1, user body measurements may be related to particular dimensions of the human body. A "dimension of the human body" as used in this disclosure, includes one or more functional body systems that are impaired by disease in a human body and/or animal body. Functional body systems may include one or more body systems recognized as attributing to root causes of disease by functional medicine practitioners and experts. A "root cause" as used in this disclosure, includes any chain of causation describing underlying reasons for a particular disease state and/or medical condition instead of focusing solely on symptomatology reversal. Root cause may include chains of causation developed by functional medicine practices that may focus on disease causation and reversal. For instance and without limitation, a medical condition such as diabetes may include a chain of causation that does not include solely impaired sugar metabolism but that also includes impaired hormone systems including insulin resistance, high cortisol, less than optimal thyroid production, and low sex hormones. Diabetes may include further chains of causation that include inflammation, poor diet, delayed food allergies, leaky gut, oxidative stress, damage to cell membranes, and dysbiosis. Dimensions of the human body may include but are not limited to epigenetics, gut-wall, microbiome, nutrients, genetics, and/or metabolism.

With continued reference to FIG. 1, epigenetic, as used herein, includes any user body measurements describing changes to a genome that do not involve corresponding changes in nucleotide sequence. Epigenetic body measurement may include data describing any heritable phenotypic. Phenotype, as used herein, include any observable trait of a user including morphology, physical form, and structure. Phenotype may include a user's biochemical and physiological properties, behavior, and products of behavior. Behavioral phenotypes may include cognitive, personality, and behavior patterns. This may include effects on cellular and physiological phenotypic traits that may occur due to external or environmental factors. For example, DNA methylation and histone modification may alter phenotypic expression of genes without altering underlying DNA sequence. Epigenetic body measurements may include data describing one or more states of methylation of genetic material.

With continued reference to FIG. 1, gut-wall, as used herein, includes the space surrounding the lumen of the gastrointestinal tract that is composed of four layers including the mucosa, submucosa, muscular layer, and serosa. The mucosa contains the gut epithelium that is composed of goblet cells that function to secrete mucus, which aids in lubricating the passage of food throughout the digestive tract. The goblet cells also aid in protecting the intestinal wall from destruction by digestive enzymes. The mucosa includes villi or folds of the mucosa located in the small intestine that increase the surface area of the intestine. The villi contain a lacteal, that is a vessel connected to the lymph system that aids in removal of lipids and tissue fluids. Villi may contain microvilli that increase the surface area over which absorption can take place. The large intestine lack villi and instead a flat surface containing goblet cells are present.

With continued reference to FIG. 1, gut-wall includes the submucosa, which contains nerves, blood vessels, and elastic fibers containing collagen. Elastic fibers contained within the submucosa aid in stretching the gastrointestinal tract with increased capacity while also maintaining the shape of the intestine. Gut-wall includes muscular layer which contains smooth muscle that aids in peristalsis and the movement of digested material out of and along the gut. Gut-wall includes the serosa which is composed of connective tissue and coated in mucus to prevent friction damage from the intestine rubbing against other tissue. Mesenteries are also found in the serosa and suspend the intestine in the abdominal cavity to stop it from being disturbed when a person is physically active.

With continued reference to FIG. 1, gut-wall body measurement may include data describing one or more test results including results of gut-wall function, gut-wall integrity, gut-wall strength, gut-wall absorption, gut-wall permeability, intestinal absorption, gut-wall barrier function, gut-wall absorption of bacteria, gut-wall malabsorption, gut-wall gastrointestinal imbalances and the like.

With continued reference to FIG. 1, gut-wall body measurement may include any data describing blood test results of creatinine levels, lactulose levels, zonulin levels, and mannitol levels. Gut-wall body measurement may include blood test results of specific gut-wall body measurements including d-lactate, endotoxin lipopolysaccharide (LPS) Gut-wall body measurement may include data breath tests measuring lactulose, hydrogen, methane, lactose, and the like. Gut-wall body measurement may include blood test results describing blood chemistry levels of albumin, bilirubin, complete blood count, electrolytes, minerals, sodium, potassium, calcium, glucose, blood clotting factors, With continued reference to FIG. 1, gut-wall body measurement may include one or more stool test results describing presence or absence of parasites, firmicutes, Bacteroidetes, absorption, inflammation, food sensitivities. Stool test results may describe presence, absence, and/or measurement of acetate, aerobic bacterial cultures, anerobic bacterial cultures, fecal short chain fatty acids, beta-glucuronidase, cholesterol, chymotrypsin, fecal color, *cryptosporidium* EIA, *Entamoeba histolytica*, fecal lactoferrin, *Giardia lamblia* EIA, long chain fatty acids, meat fibers and vegetable fibers, mucus, occult blood, parasite identification, phospholipids, propionate, putrefactive short chain fatty acids, total fecal fat, triglycerides, yeast culture, n-butyrate, pH and the like.

With continued reference to FIG. 1, gut-wall body measurement may include one or more stool test results describing presence, absence, and/or measurement of microorganisms including bacteria, archaea, fungi, protozoa, algae, viruses, parasites, worms, and the like. Stool test results may contain species such as *Bifidobacterium* species, *campylobacter* species, *Clostridium difficile, cryptosporidium* species, *Cyclospora cayetanensis, Cryptosporidium* EIA, *Dientamoeba fragilis, Entamoeba histolytica, Escherichia coli, Entamoeba histolytica, Giardia, H. pylori, Candida albicans, Lactobacillus* species, worms, macroscopic worms, mycology, protozoa, Shiga toxin *E. coli*, and the like.

With continued reference to FIG. 1, gut-wall body measurement may include one or more microscopic ova exam results, microscopic parasite exam results, protozoan polymerase chain reaction test results and the like. Gut-wall body measurement may include enzyme-linked immunosorbent assay (ELISA) test results describing immunoglobulin G (Ig G) food antibody results, immunoglobulin E (Ig E) food antibody results, Ig E mold results, IgG spice and herb results. Gut-wall body measurement may include measurements of calprotectin, eosinophil protein x (EPX), stool weight, pancreatic elastase, total urine volume, blood creatinine levels, blood lactulose levels, blood mannitol levels.

With continued reference to FIG. 1, gut-wall body measurement may include one or more elements of data describing one or more procedures examining gut including for example colonoscopy, endoscopy, large and small molecule challenge and subsequent urinary recovery using large molecules such as lactulose, polyethylene glycol-3350, and small molecules such as mannitol, L-rhamnose, polyethyleneglycol-400. Gut-wall body measurement may include data describing one or more images such as x-ray, MRI, CT scan, ultrasound, standard barium follow-through examination, barium enema, barium with contract, MRI fluoroscopy, positron emission tomography 9PET), diffusion-weighted MRI imaging, and the like.

With continued reference to FIG. 1, microbiome, as used herein, includes ecological community of commensal, symbiotic, and pathogenic microorganisms that reside on or within any of a number of human tissues and biofluids. For example, human tissues and biofluids may include the skin, mammary glands, placenta, seminal fluid, uterus, vagina, ovarian follicles, lung, saliva, oral mucosa, conjunctiva, biliary, and gastrointestinal tracts. Microbiome may include for example, bacteria, archaea, protists, fungi, and viruses. Microbiome may include commensal organisms that exist within a human being without causing harm or disease. Microbiome may include organisms that are not harmful but rather harm the human when they produce toxic metabolites such as trimethylamine. Microbiome may include pathogenic organisms that cause host damage through virulence factors such as producing toxic by-products. Microbiome may include populations of microbes such as bacteria and yeasts that may inhabit the skin and mucosal surfaces in various parts of the body. Bacteria may include for example Firmicutes species, Bacteroidetes species, Proteobacteria species, Verrumicrobia species, Actinobacteria species, Fusobacteria species, Cyanobacteria species and the like. Archaea may include methanogens such as Methanobrevibacter smithies' and Methanosphaera stadtmanae. Fungi may include *Candida* species and *Malassezia* species. Viruses may include bacteriophages. Microbiome species may vary in different locations throughout the body. For example, the genitourinary system may contain a high prevalence of *Lactobacillus* species while the gastrointestinal tract may contain a high prevalence of *Bifidobacterium* species while the lung may contain a high prevalence of *Streptococcus* and *Staphylococcus* species.

With continued reference to FIG. 1, microbiome body measurement may include one or more stool test results describing presence, absence, and/or measurement of microorganisms including bacteria, archaea, fungi, protozoa, algae, viruses, parasites, worms, and the like. Stool test results may contain species such as *Ackerman's mucin-iphila, Anaerotruncus colihominis*, bacteriology, *Bacteroides vulgates', Bacteroides-Prevotella, Barnesiella* species, *Bifidobacterium* longarm, *Bifidobacterium* species, *Butyrivbrio crossotus, Clostridium* species, *Collinsella aerofaciens*, fecal color, fecal consistency, *Coprococcus eutactus, Desulfovibrio piger, Escherichia coli, Faecalibacterium prausnitzii*, Fecal occult blood, Firmicutes to Bacteroidetes ratio, *Fusobacterium* species, *Lactobacillus* species, *Methanobrevibacter smithii*, yeast minimum inhibitory concentration, bacteria minimum inhibitory concentration, yeast mycology, fungi mycology, *Odoribacter* species, *Oxalobacter formigenes*, parasitology, *Prevotella* species, *Pseudoflavonifractor* species, *Roseburia* species, *Ruminococcus* species, *Veillonella* species and the like.

With continued reference to FIG. 1, microbiome body measurement may include one or more stool tests results that identify all microorganisms living a user's gut including bacteria, viruses, archaea, yeast, fungi, parasites, and bacteriophages. Microbiome body measurement may include DNA and RNA sequences from live microorganisms that may impact a user's health. Microbiome body measurement may include high resolution of both species and strains of all microorganisms. Microbiome body measurement may include data describing current microbe activity. Microbiome body measurement may include expression of levels of active microbial gene functions. Microbiome body measurement may include descriptions of sources of disease causing microorganisms, such as viruses found in the gastrointestinal tract such as raspberry bushy swarf virus from consuming contaminated raspberries or Pepino mosaic virus from consuming contaminated tomatoes.

With continued reference to FIG. 1, microbiome body measurement may include one or more blood test results that identify metabolites produced by microorganisms. Metabolites may include for example, indole-3-propionic acid, indole-3-lactic acid, indole-3-acetic acid, tryptophan, serotonin, kynurenine, total indoxyl sulfate, tyrosine, xanthine, 3-methylxanthine, uric acid, and the like.

With continued reference to FIG. 1, microbiome body measurement may include one or more breath test results that identify certain strains of microorganisms that may be present in certain areas of a user's body. This may include for example, lactose intolerance breath tests, methane-based breath tests, hydrogen based breath tests, fructose based breath tests. *Helicobacter pylori* breath test, fructose intolerance breath test, bacterial overgrowth syndrome breath tests and the like.

With continued reference to FIG. 1, microbiome body measurement may include one or more urinary analysis results for certain microbial strains present in urine. This may include for example, urinalysis that examines urine specific gravity, urine cytology, urine sodium, urine culture, urinary calcium, urinary hematuria, urinary glucose levels, urinary acidity, urinary protein, urinary nitrites, bilirubin, red blood cell urinalysis, and the like.

With continued reference to FIG. 1, nutrient as used herein, includes any substance required by the human body to function. Nutrients may include carbohydrates, protein, lipids, vitamins, minerals, antioxidants, fatty acids, amino acids, and the like. Nutrients may include for example vitamins such as thiamine, riboflavin, niacin, pantothenic acid, pyridoxine, biotin, folate, cobalamin, Vitamin C, Vitamin A, Vitamin D, Vitamin E, and Vitamin K. Nutrients may include for example minerals such as sodium, chloride, potassium, calcium, phosphorous, magnesium, sulfur, iron, zinc, iodine, selenium, copper, manganese, fluoride, chromium, molybdenum, nickel, aluminum, silicon, vanadium, arsenic, and boron.

With continued reference to FIG. 1, nutrients may include extracellular nutrients that are free floating in blood and exist outside of cells. Extracellular nutrients may be located in serum. Nutrients may include intracellular nutrients which may be absorbed by cells including white blood cells and red blood cells.

With continued reference to FIG. 1, nutrient body measurement may include one or more blood test results that identify extracellular and intracellular levels of nutrients. Nutrient body measurement may include blood test results that identify serum, white blood cell, and red blood cell levels of nutrients. For example, nutrient body measurement may include serum, white blood cell, and red blood cell levels of micronutrients such as Vitamin A, Vitamin B1, Vitamin B2, Vitamin B3, Vitamin B6, Vitamin B12, Vitamin B5, Vitamin C, Vitamin D, Vitamin E, Vitamin K1, Vitamin K2, and folate.

With continued reference to FIG. 1, nutrient body measurement may include one or more blood test results that identify serum, white blood cell and red blood cell levels of nutrients such as calcium, manganese, zinc, copper, chromium, iron, magnesium, copper to zinc ratio, choline, inositol, carnitine, methylmalonic acid (MMA), sodium, potassium, asparagine, glutamine, serine, coenzyme q10, cysteine, alpha lipoic acid, glutathione, selenium, eicosapentaenoic acid (EPA), docosahexaenoic acid (DHA), docosapentaenoic acid (DPA), total omega-3, lauric acid, arachidonic acid, oleic acid, total omega 6, and omega 3 index.

With continued reference to FIG. 1, nutrient body measurement may include one or more salivary test results that identify levels of nutrients including any of the nutrients as described herein. Nutrient body measurement may include hair analysis of levels of nutrients including any of the nutrients as described herein.

With continued reference to FIG. 1, genetic as used herein, includes any inherited trait. Inherited traits may include genetic material contained with DNA including for example, nucleotides. Nucleotides include adenine (A), cytosine (C), guanine (G), and thymine (T). Genetic information may be contained within the specific sequence of an individual's nucleotides and sequence throughout a gene or DNA chain. Genetics may include how a particular genetic sequence may contribute to a tendency to develop a certain disease such as cancer or Alzheimer's disease.

With continued reference to FIG. 1, genetic body measurement may include one or more results from one or more blood tests, hair tests, skin tests, urine, amniotic fluid, buccal swabs and/or tissue test to identify a user's particular sequence of nucleotides, genes, chromosomes, and/or proteins. Genetic body measurement may include tests that example genetic changes that may lead to genetic disorders. Genetic body measurement may detect genetic changes such as deletion of genetic material or pieces of chromosomes that may cause Duchenne Muscular Dystrophy. Genetic body measurement may detect genetic changes such as insertion of genetic material into DNA or a gene such as the BRCA1 gene that is associated with an increased risk of breast and ovarian cancer due to insertion of 2 extra nucleotides. Genetic body measurement may include a genetic change such as a genetic substitution from a piece of genetic material that replaces another as seen with sickle cell anemia where one nucleotide is substituted for another. Genetic body measurement may detect a genetic change such as a duplication when extra genetic material is duplicated one or more times within a person's genome such as with Charcot-Marie Tooth disease type 1. Genetic body measurement may include a genetic change such as an amplification when there is more than a normal number of copies of a gene in a cell such as HER2 amplification in cancer cells. Genetic body measurement may include a genetic change such as a chromosomal translocation when pieces of chromosomes break off and reattach to another chromosome such as with the BCR-ABL1 gene sequence that is formed when pieces of chromosome 9 and chromosome 22 break off and switch places. Genetic body measurement may include a genetic change such as an inversion when one chromosome experiences two breaks and the middle piece is flipped or inverted before reattaching. Genetic body measurement may include a repeat such as when regions of DNA contain a sequence of nucleotides that repeat a number of times such as for example in Huntington's disease or Fragile X syndrome. Genetic body measurement may include a genetic change such as a trisomy when there are three chromosomes instead of the usual pair as seen with Down syndrome with a trisomy of chromosome 21, Edwards syndrome with a trisomy at chromosome 18 or Patau syndrome with a trisomy at chromosome 13. Genetic body measurement may include a genetic change such as monosomy such as when there is an absence of a chromosome instead of a pair, such as in Turner syndrome.

With continued reference to FIG. 1, genetic body measurement may include an analysis of COMT gene that is responsible for producing enzymes that metabolize neurotransmitters. Genetic body measurement may include an analysis of DRD2 gene that produces dopamine receptors in the brain. Genetic body measurement may include an analysis of ADRA2B gene that produces receptors for noradrenaline. Genetic body measurement may include an analysis of 5-HTTLPR gene that produces receptors for serotonin. Genetic body measurement may include an analysis of BDNF gene that produces brain derived neurotrophic factor. Genetic body measurement may include an analysis of 9p21 gene that is associated with cardiovascular disease risk. Genetic body measurement may include an analysis of APOE gene that is involved in the transportation of blood lipids such as cholesterol. Genetic body measurement may include an analysis of NOS3 gene that is involved in producing enzymes involved in regulating vaso-dilation and vaso-constriction of blood vessels.

With continued reference to FIG. 1, genetic body measurement may include ACE gene that is involved in producing enzymes that regulate blood pressure. Genetic body measurement may include SLCO1B1 gene that directs pharmaceutical compounds such as statins into cells. Genetic body measurement may include FUT2 gene that produces enzymes that aid in absorption of Vitamin B12 from digestive tract. Genetic body measurement may include MTHFR gene that is responsible for producing enzymes that aid in metabolism and utilization of Vitamin B9 or folate. Genetic body measurement may include SHMT1 gene that aids in production and utilization of Vitamin B9 or folate. Genetic body measurement may include MTRR gene that produces enzymes that aid in metabolism and utilization of Vitamin B12. Genetic body measurement may include MTR gene that produces enzymes that aid in metabolism and utilization of Vitamin B12. Genetic body measurement may include FTO gene that aids in feelings of satiety or fulness after eating. Genetic body measurement may include MC4R gene that aids in producing hunger cues and hunger triggers. Genetic body measurement may include APOA2 gene that directs body to produce ApoA2 thereby affecting absorption of saturated fats. Genetic body measurement may include UCP1 gene that aids in controlling metabolic rate and thermoregulation of body. Genetic body measurement may include TCF7L2 gene that regulates insulin secretion. Genetic body measurement may include AMY1 gene that aids in digestion of starchy foods. Genetic body measurement may include MCM6 gene that controls production of lactase enzyme that aids in digesting lactose found in dairy products. Genetic body measurement may include BCMO1 gene that aids in producing enzymes that aid in metabolism and activation of Vitamin A. Genetic body measurement may include SLC23A1 gene that produce and transport Vitamin C. Genetic body measurement may include CYP2R1 gene that produce enzymes involved in production and activation of Vitamin D. Genetic body measurement may include GC gene that produce and transport Vitamin D. Genetic body measurement may include CYP1A2 gene that aid in metabolism and elimination of caffeine. Genetic body measurement may include CYP17A1 gene that produce enzymes that convert progesterone into androgens such as androstenedione, androstendiol, dehydroepiandrosterone, and testosterone.

With continued reference to FIG. 1, genetic body measurement may include CYP19A1 gene that produce enzymes that convert androgens such as androstenedione and testosterone into estrogens including estradiol and estrone. Genetic body measurement may include SRD5A2 gene that aids in production of enzymes that convert testosterone into dihydrotestosterone. Genetic body measurement may include UFT2B17 gene that produces enzymes that metabolize testosterone and dihydrotestosterone. Genetic body measurement may include CYP1A1 gene that produces enzymes that metabolize estrogens into 2 hydroxy-estrogen. Genetic body measurement may include CYP1B1 gene that produces enzymes that metabolize estrogens into 4 hydroxy-estrogen. Genetic body measurement may include CYP3A4 gene that produces enzymes that metabolize estrogen into 16 hydroxy-estrogen. Genetic body measurement may include COMT gene that produces enzymes that metabolize 2 hydroxy-estrogen and 4 hydroxy-estrogen into methoxy estrogen. Genetic body measurement may include GSTT1 gene that produces enzymes that eliminate toxic by-products generated from metabolism of estrogens. Genetic body measurement may include GSTM1 gene that produces enzymes responsible for eliminating harmful by-products generated from metabolism of estrogens. Genetic body measurement may include GSTP1 gene that produces enzymes that eliminate harmful by-products generated from metabolism of estrogens. Genetic body measurement may include SOD2 gene that produces enzymes that eliminate oxidant by-products generated from metabolism of estrogens.

With continued reference to FIG. 1, metabolic, as used herein, includes any process that converts food and nutrition into energy. Metabolic may include biochemical processes that occur within the body. Metabolic body measurement may include blood tests, hair tests, skin tests, amniotic fluid, buccal swabs and/or tissue test to identify a user's metabolism. Metabolic body measurement may include blood tests that examine glucose levels, electrolytes, fluid balance, kidney function, and liver function. Metabolic body measurement may include blood tests that examine calcium levels, albumin, total protein, chloride levels, sodium levels, potassium levels, carbon dioxide levels, bicarbonate levels, blood urea nitrogen, creatinine, alkaline phosphatase, alanine amino transferase, aspartate amino transferase, bilirubin, and the like.

With continued reference to FIG. 1, metabolic body measurement may include one or more blood, saliva, hair, urine, skin, and/or buccal swabs that examine levels of hormones within the body such as 11-hydroxy-androsterone, 11-hydroxy-etiocholanolone, 11-keto-androsterone, 11-keto-etiocholanolone, 16 alpha-hydroxyestrone, 2-hydroxyestrone, 4-hydroxyestrone, 4-methoxyestrone, androstanediol, androsterone, creatinine, DHEA, estradiol, estriol, estrone, etiocholanolone, pregnanediol, pregnanestriol, specific gravity, testosterone, tetrahydrocortisol, tetrahydrocrotisone, tetrahydrodeoxycortisol, allo-tetrahydrocortisol.

With continued reference to FIG. 1, metabolic body measurement may include one or more metabolic rate test results such as breath tests that may analyze a user's resting metabolic rate or number of calories that a user's body burns each day rest. Metabolic body measurement may include one or more vital signs including blood pressure, breathing rate, pulse rate, temperature, and the like. Metabolic body measurement may include blood tests such as a lipid panel such as low density lipoprotein (LDL), high density lipoprotein (HDL), triglycerides, total cholesterol, ratios of lipid levels such as total cholesterol to HDL ratio, insulin sensitivity test, fasting glucose test, Hemoglobin A1C test, adipokines such as leptin and adiponectin, neuropeptides such as ghrelin, pro-inflammatory cytokines such as interleukin 6 or tumor necrosis factor alpha, anti-inflammatory cytokines such as interleukin 10, markers of antioxidant status such as oxidized low-density lipoprotein, uric acid, paraoxonase 1. Persons skilled in the art, upon reviewing the entirety of this disclosure, will be aware of various additional examples of physiological state data that may be used consistently with descriptions of systems and methods as provided in this disclosure.

With continued reference to FIG. 1, physiological data may be obtained from a physically extracted sample. A "physical sample" as used in this example, may include any sample obtained from a human body of a user. A physical sample may be obtained from a bodily fluid and/or tissue analysis such as a blood sample, tissue, sample, buccal swab, mucous sample, stool sample, hair sample, fingernail sample and the like. A physical sample may be obtained from a device in contact with a human body of a user such as a microchip embedded in a user's skin, a sensor in contact with a user's skin, a sensor located on a user's tooth, and the like. Physiological data may be obtained from a physically extracted sample. A physical sample may include a signal from a sensor configured to detect physiological data of a user and record physiological data as a function of the signal. A sensor may include any medical sensor and/or medical device configured to capture sensor data concerning a patient, including any scanning, radiological and/or imaging device such as without limitation x-ray equipment, computer assisted tomography (CAT) scan equipment, positron emission tomography (PET) scan equipment, any form of magnetic resonance imagery (MM) equipment, ultrasound equipment, optical scanning equipment such as photo-plethysmographic equipment, or the like. A sensor may include any electromagnetic sensor, including without limitation electroencephalographic sensors, magnetoencephalographic sensors, electrocardiographic sensors, electromyographic sensors, or the like. A sensor may include a temperature sensor. A sensor may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate or the like. A sensor may detect any hematological parameter including blood oxygen level, pulse rate, heart rate, pulse rhythm, blood sugar, and/or blood pressure. A sensor may be configured to detect internal and/or external biomarkers and/or readings. A sensor may be a part of system 100 or may be a separate device in communication with system 100.

With continued reference to FIG. 1, one or more biological extractions 116 and/or elements of user physiological data may be stored in a user database 120. User database 120 may be implemented, without limitation, as a relational database, a key-value retrieval datastore such as a NOSQL database, or any other form or structure for use as a datastore that a person skilled in the art would recognize as suitable upon review of the entirety of this disclosure With continued reference to FIG. 1, computing device 104 is configured to calculate a user effective age 124. A "user effective age," as used in this disclosure, is an age of a user as adjusted to reflect a life expectancy that differs from an actuarially projected life expectancy. For instance, a user effective age 124 of a person predicted to live fewer years than actuarially projected may be higher than a user effective age 124 of a person predicted to match and/or exceed an actuarially projected life expectancy. User effective age 124 may be used as a representation of a user's likely overall state of health, inasmuch as a user's likelihood to exceed or fall short of actuarially projected life expectancy may be closely linked to a user's state of health. A user's "chronological age," as defined in this disclosure, is an age of the user as measured in years, or other units of time, from the date of the user's birth to the date of the measurement, where a "date" may include any calendar date, Julian date, or the like. A chronological age may be used to project a user's "actuarial life expectancy," defined as a probable age of death, as predicted using any actuarial method and/or table, and/or an interval from a date such as the present date to the probable age of death; actuarial methods may include looking up and/or calculating a user's life expectancy using date of birth and/or demographic information about the user such as sex, ethnicity, geographic location, nationality, or the like. A user effective age 124 may be calculated based on a user's chronological age and a user's biological extraction 116. For instance and without limitation, computing device 104 may add several years to a user's chronological age to output an effective age 124 that is older than a user's chronological age when a user's biological extraction 116 contains abnormal findings or a laboratory finding that is outside of normal limits. In yet another non-limiting example, computing device 104 may subtract several years to a user's chronological age to output an effective age 124 that is younger than a user's chronological age when a user's biological extraction 116 contains normal findings or a laboratory finding that is within and/or below normally accepted limits.

With continued reference to FIG. 1, user effective age 124 may be calculated by multiplying a telomer length factor by an endocrinal factor multiplied by a histone variance factor to produce a positive effective age 124 score. A "telomer length factor," as used in this disclosure, is a factor that may be multiplied by a user's chronological age to reflect an effect that telomeric length and/or a change in telomere length has on the user's effective age 124. Calculation may include prediction of a variance from actuarial life expectancy for a given person, as defined above, as determined based on telomeric length and/or variation in telomere length. A difference between these two values may be added to a user chronological age and then divided by the user chronological age to calculate a "raw" factor, for instance as described above; this may then be multiplied by a weight to determine the telomer length factor, whereas above the weight may be calculated to offset relatedness between telomere length and/or change in telomere length and other elements used to calculate age factors as described herein, such as endocrinal age factors. A computing device 104 may determine telomer length factor by retrieving telomer length factor from an expert knowledge database 128. Expert knowledge database 128 may be implemented, without limitation, as a relational database, a key-value retrieval datastore such as a NOSQL database, or any other form or structure for use as a datastore that a person skilled in the art would recognize as suitable upon review of the entirety of this disclosure. For instance, and without limitation, one or more experts may enter data in expert knowledge database 128 indicative of an effect on user life expectancy; such data may, for instance, be entered as described in further detail below.

With continued reference to FIG. 1, an "endocrinal factor," as used in this disclosure, is a factor that may be multiplied by a user's chronological age to reflect an effect that endocrinal data has on the user's effective age 124. Endocrinal data may include any physiological data relating to the endocrine system. The endocrine system includes glands that include the pineal gland, the thyroid gland, the parathyroid gland, the pituitary gland, the adrenal gland, the pancreas, the ovaries, and the testis. Endocrinal data may include one or more measurements of function of the endocrine system such as for example, a measurement of thyroid stimulating hormone (TSH) or a fasting serum insulin level. Calculation of an endocrinal factor may include any calculation for telomer length factor as described above.

With continued reference to FIG. 1, a "histone variance factor," as used in this disclosure, is a factor that may be multiplied by a user's chronological age to reflect an effect that loss of histones has on the user's effective age 124. Histones include alkaline proteins found in cell nuclei that package and order DNA into nucleosomes. Histones are the primary component of chromatin, maintaining a role in gene regulation. Histone loss may be linked with cell division, as reduced synthesis of new histones has been seen to be corelated with shortened telomeres that activate a DNA damage response. Loss of core histones include H2A, H2B, H3, and H4 may be considered an epigenetic mark of aging. Calculation of a histone variance factor may include any calculation for telomer length factor as described above.

With continued reference to FIG. 1, computing device 104 multiplies a telomer length factor by an endocrinal factor multiplied by a histone variance factor to produce a positive effective age score. A "positive effective age score," as used in this disclosure, is a score that results from positive influences that tend to extend life expectancy. In an embodiment, positive influences may aid in lowering an effective age 124 to be lower than a user's chronological age. Computing device 104 adds a user behavior pattern and a user danger profile to produce a negative effective age score. A user behavior pattern and a user danger profile are described below in more detail. A "negative effective age score," as used in this disclosure, is a score that results from negative influences that tend to reduce life expectancy. In an embodiment, negative influences may result in an effective age 124 being older than a user's chronological age. Computing device 104 adjusts a user chronological age to produce a user effective age 124 utilizing a positive effective age score and a negative effective age score. In an embodiment, computing device 104 may utilize a positive effective age score to lower a user's effective age in comparison to a user's chronological age, and utilize a negative effective age score to raise a user's effective age 124 in comparison to a user's chronological age.

With continued reference to FIG. 1, computing device 104 is configured to determine a user behavior pattern 132. A "user behavior pattern," as used in this disclosure, is any behavior that has an effect on a coverage request 112. A behavior a user is engaged in may be a nutritional behavior, such as a daily consumption of sugar, fat, fiber, protein, or the like. A behavior a user is engaged in may include an exercise behavior, which may be measured in terms of a duration per day, week, or the like of cardiovascular exercise, resistance training exercise, or other exercise category, a number of steps per week taken, resting and/or total calorie consumption numbers, or the like. A behavior a user is engaged in may include a substance abuse behavior, including some measure of a dosage per period of time consumed of a harmful and/or addictive substance such as an opiate, alcohol, tobacco, stimulants such as cocaine, methamphetamine or the like, hallucinogens, narcotics, or other mood-altering chemicals. A behavior a user is engaged in may include a sleep behavior, including a number of hours per night a user sleeps, a number of nights a user goes with less than a recommended amount of sleep, or the like.

With continued reference to FIG. 1, user behavior pattern 132 may be identified by a user entry; for instance, and without limitation, a computing device 104 may provide a user with a questionnaire in the form of one or more data fields requesting that the user identify activities in which the user engaged. Questions presented to a user may include a number of servings of alcohol a user consumes during a given period of time such as a day, a week or a year, a quantity of tobacco, drugs, or other substances that a user consumes during a given period of time, a number of hours a user sleeps in a night, or the like. Questions presented to a user may be related to a category of coverage request 112. For instance and without limitation, a request for automobile insurance coverage may result in computing device 104 presenting to a user questions relating to if the user follows the rules of the road, drives within normal speed limits, and/or has been in any accidents over the course of the past three years. A user may respond to such questions by selecting options corresponding to particular ranges of data, by setting sliders or other indicators of a quantity along a continuous range, by entering values in drop-down lists, and/or by typing in numbers or text. Another person may alternatively or additionally enter information concerning a user's behavior patterns. For instance and without limitation, a user's spouse may enter information regarding a user's exercise and fitness habits when requesting coverage for life insurance. In an embodiment, computing device 104 may include a graphical user interface 136 that may display questions to a user regarding a user's behavior patterns. Graphical user interface 136 may include without limitation a form or other graphical element having display fields, where one or more questions may be displayed to a user.

With continued reference to FIG. 1, user behavior pattern 132 may be generated by computing device 104 utilizing training data. Training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure.

With continued reference to FIG. 1, computing device 104 receives behavior training data 140. "behavior training data," as used in this disclosure, is training data that includes a plurality of data entries containing a plurality of biological extraction 116 and a plurality of correlated behavior patterns. Computing device 104 calculates a behavior pattern output utilizing a behavior machine-learning model. A machine-learning model, as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 1, a machine learning process, also referred to as a machine-learning algorithm, is a process that automatedly uses training data and/or a training set as described above to generate an algorithm that will be performed by a computing device 104 and/or module to produce outputs given data provided as inputs; this is in contrast to a non-machine learning software program where the commands to be executed are determined in advance by a user and written in a programming language.

Continuing to refer to FIG. 1, machine-learning algorithms may be implemented using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure, Still referring to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 1, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised machine-learning process may include a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

With continued reference to FIG. 1, supervised machine-learning processes may include classification algorithms, defined as processes whereby a computing device 104 derives, from training data, a model for sorting inputs into categories or bins of data. Classification may be performed using, without limitation, linear classifiers such as without limitation logistic regression and/or naive Bayes classifiers, nearest neighbor classifiers including without limitation k-nearest neighbors classifiers, support vector machines, decision trees, boosted trees, random forest classifiers, and/or neural network-based classifiers.

Still referring to FIG. 1, machine learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like. Unsupervised machine-learning algorithms may include, without limitation, clustering algorithms and/or cluster analysis processes, such as without limitation hierarchical clustering, centroid clustering, distribution clustering, clustering using density models, subspace models, group models, graph-based models, signed graph models, neural models, or the like. Unsupervised learning may be performed by neural networks and/or deep learning protocols as described above.

With continued reference to FIG. 1, computing device 104 generates a behavior machine-learning model 144. A "behavior machine-learning model," as used in this disclosure, is a machine-learning model that utilizes a biological extraction 116 as an input and outputs behavior patterns. A behavior machine-learning model 144 may include any of the machine-learning models as described above. A behavior machine-learning model 144 may include performing a series of one or more calculations, algorithms, and/or equations. Computing device 104 identifies a behavior pattern as a function of calculating a behavior model.

With continued reference to FIG. 1, computing device 104 is configured to identify a user danger profile 148. A "user danger profile," as used in this disclosure, is data describing any risky behavior that has an effect on a coverage request 112. Risky behavior may include engaging in one or more activities that may greatly increase one's chance of injury, pain, health related complications, and/or death. Risky behavior may include behaviors that contribute to unintentional injuries and violence such as riding a bicycle without a helmet or texting someone while driving a vehicle. Risky behavior may include sexual behaviors that lead to unwanted pregnancies and/or sexually transmitted diseases. Risky behavior may include engaging in activities that may increase the risk of injury, harm, and/or death including for example BASE jumping, skydiving, flying a light aircraft, auto racing, scuba diving, mountain climbing, surfing, extreme white water rafting trips, back country skiing, hang gliding, boat racing, bike racing, hot air ballooning, parachuting, bungee jumping, heli-skiing, and the like. A user danger profile 148 may be self-reported by a user as described above in reference to user behavior pattern 132. For example, a user may self-report that user engages in one or more risky behaviors such as hot air ballooning once per week. In an embodiment, a user may answer one or more questionnaires regarding risky behaviors that may engage in. In an embodiment, graphical user interface 136 may display one or more risky behaviors and prompt the user to answer questions describing what risky behavior the user engages in, how frequently, and for how long. Graphical user interface 136 may contain one or more sliders that may allow for a user to indicate the frequency with which a user engages in risky behaviors. In an embodiment, graphical user interface 136 may provide free form textual entries where a user may write one or more responses regarding risky behaviors that the user engages in. In an embodiment, a family member, friend, co-worker, spouse, and/or acquittance may provide answers to one or more questions regarding a user's engagement in risky behaviors.

With continued reference to FIG. 1, computing device 104 may identify a user danger profile 148 using training data. Computing device 104 is configured to receive danger training data 152. "Danger training data," as used in this disclosure, is training data that includes a plurality of data entries containing a plurality of biological extraction 116 and a plurality of danger profiles. Computing device 104 utilizes danger training data 152 to generate a danger profile output utilizing a danger machine-learning model 156. A "danger machine-learning model," as used in this disclosure, is a machine-learning model that utilizes a biological extraction 116 as an input and outputs danger profiles. Danger machine-learning model 156 may be implemented as any machine-learning model as described above. Computing device 104 utilizes danger machine-learning model 156 to select a danger profile as a function of generating the danger machine-learning model 156.

With continued reference to FIG. 1, computing device 104 is configured to produce a user coverage profile 160. A "user coverage profile," as used in this disclosure, is a compilation of elements utilized by computing device 104 to generate potential coverage options related to a coverage request 112. Elements utilized to generate potential coverage options include a user biological extraction 116, a user effective age 124, a user behavior pattern 132, a user danger profile 148, a user chronological age and the like. In an embodiment, computing device 104 may utilize one or more additional elements to generate potential coverage options. In an embodiment, computing device 104 may utilize an element that includes a user stability profile 164. A "user stability profile," as used in this disclosure, is data describing any behavior that indicates appropriate well-thought out decisions and consistent behavior. Consistent behavior may include indicators that show continued employment, stable income, carrying little debt, maintaining a home, having continued access to transportation, residing and/or working in safe neighborhoods and areas, access to parks and playgrounds, walkability of where someone lives. Consistent behavior may include one or more markers of a user's education including literacy, languages spoken, early childhood education, vocational training, and higher education. Consistent behavior may include one or more markers of nutrition that reflect little experienced hunger, ability to consume fresh produce, and access to healthy options. In an embodiment, computing device 104 may utilize an additional element to generate a potential coverage options 176 that includes a user community profile 168. A "user community profile," as used in this disclosure, is data describing any behavior that indicates integration and/or engagement with a local community. Local communities may include any social unit that shares one or more common norms, religion, values, customs and/or identity. Local communities may share a sense of place situated in a given geographical area and/or share a virtual space through communication platforms. Local communities may be based on location such as communities of place that range from local neighborhoods, suburbs, villages, towns, cities, regions, nations, and/or planet as a whole. Local communities may be identity based communities including local cliques, sub-cultures, ethnic groups, religions, multicultural and/or pluralistic civilizations and the like. Local communities may be based on family and/or network based guilds such as incorporated associations, political decision making structures, economic enterprises, and/or professional associations. A user community profile 168 may indicate any social integration, support systems, and/or community engagement that a user has participated in. For instance and without limitation, a user community profile 168 may indicate that a user engages in a weekly choir group or volunteers once per month at a soup kitchen. In an embodiment, additional elements utilized to generate potential coverage options 176 may be self-reported by a user such as by entering information into graphical user interface 136 utilizing any of the methodologies as described herein. In an embodiment, a third-party may enter one or more elements of information regarding a user such as a user's family member, friend, spouse, coworker and the like.

With continued reference to FIG. 1, computing device 104 is configured to select a coverage machine-learning model 172. A "coverage machine-learning model," as used in this disclosure, is a machine-learning model that utilizes a user coverage profile 160 as an input and outputs a plurality of coverage options 176. "Coverage options," as used in this disclosure, are any insurance plans that are deemed compatible for a user and fulfill any requests contained within a coverage request 112. Coverage options 176 may include an explanation of benefits that described covered services, premiums, deductibles, co-payments, co-insurance, coverage limits, out of pocket maximums, capitation, in-network service providers, out of network service providers, formularies, covered benefits, non-covered benefits and the like.

With continued reference to FIG. 1, computing device 104 may select a coverage model using a classification algorithm. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Classification algorithm may include a process where computing device 104 derives, from training data, a model known as a "classifier" for sorting inputs into categories or bins of data. Classification algorithm may be utilized to utilize a coverage request 112 and a user biological extraction 116 as an input and output a coverage machine-learning model 172. Computing device 104 utilizes a classification algorithm to select aa coverage machine-learning model 172. Classification algorithm may include performing a series of one or more calculations, algorithms, and/or equations. Computing device 104 selects utilizing a classification algorithm a coverage machine-learning model 172.

With continued reference to FIG. 1, computing device 104 may select a coverage machine-learning model 172 utilizing a coverage category. A "coverage category," as used in this disclosure, is a coverage request 112 for a class of insurance coverage. A class of insurance coverage, may include insurance for a particular purpose such as dental insurance, medical insurance, life insurance, boat insurance, car insurance and the like. A class of insurance coverage may include any of the classes of insurance coverage as described above. Computing device 104 may extract from a coverage request 112 a coverage category. Computing device 104 may include a language processing module 180 that may be configured to extract one or more words from a coverage request. Language processing module 180 may include any hardware and/or software module. Language processing module 180 may be configured to extract, from one or more inputs, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module 180 may operate to produce a language processing model. Language processing model may include a program automatically generated by a computing device 104 and/or language processing module 180 to produce associations between one or more words extracted from at least a document and detect associations, including without limitation mathematical associations, between such words, and/or associations of extracted words with coverage categories. Associations between language elements, where language elements include for purposes herein extracted words describing and/or including coverage category may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a coverage category. As a further example, statistical correlations and/or mathematical associations may include probabilistic formulas or relationships indicating a positive and/or negative association between at least an extracted word and/or a given coverage category; positive or negative indication may include an indication that a given document is or is not indicating a coverage category. For instance, and without limitation, a negative indication may be determined from a phrase such as "car insurance is not needed at this time," whereas a positive indication may be determined from a phrase such as "health insurance is needed right away," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory on a computing device 104, or the like.

Still referring to FIG. 1, language processing module 180 and/or a computing device 104 may generate a language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category of a coverage request 112 and a given relationship of such categories to coverage categories. There may be a finite number of coverage categories to which an extracted word may pertain; an HMM inference algorithm, such as the forward-backward algorithm or the Viterbi algorithm, may be used to estimate the most likely discrete state given a word or sequence of words. Language processing module 180 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 180 may use a corpus of documents to generate associations between language elements in a language processing module 180, and a computing device 104 may then use such associations to analyze words extracted from one or more documents and determine that the one or more documents indicate significance of a coverage category. In an embodiment, a computing device 104 may perform this analysis using a selected set of significant documents, such as documents identified by one or more experts as representing good science, good clinical analysis, or the like; experts may identify or enter such documents via a graphical user interface 136 as described below, or may communicate identities of significant documents according to any other suitable method of electronic communication, or by providing such identity to other persons who may enter such identifications into a computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, a computing device 104 may automatically obtain the document using such an identifier, for instance by submitting a request to a database or compendium of documents such as JSTOR as provided by Ithaka Harbors, Inc. of New York.

With continued reference to FIG. 1, computing device 104 selects a coverage machine-learning model 172 intended for a coverage category extracted from a coverage request 112. Computing device 104 may match a coverage category extracted from a coverage request 112 to a machine-learning model intended for a coverage category. For instance and without limitation, a first coverage model may be intended for automobile insurance, a second coverage model intended for flood insurance, a third coverage model intended for life insurance and a fourth coverage model intended for airplane insurance. In such an instance, computing device 104 may match a coverage request 112 that contains a request for life insurance to the third coverage model intended for life insurance. In an embodiment, selection of a coverage machine-learning model 172 may be based on expert input, including any of the expert input as described herein.

With continued reference to FIG. 1, computing device 104 is configured to generate a selected coverage machine-learning model 172. A selected coverage machine-learning model 172 utilizes a user coverage profile 160 as an input and outputs a plurality of coverage options 176. Coverage options 176 include any of the coverage options 176 as described above. Coverage machine-learning model 172 may be generated by performing a series of one or more calculations, algorithms, and/or equations.

With continued reference to FIG. 1, computing device 104 outputs a plurality of coverage options 176 as a function of generated a selected coverage machine-learning model 172. In an embodiment, computing device 104 may display a plurality of coverage options 176 on a graphical user interface 136 located on computing device 104. In an embodiment, computing device 104 may transmit a plurality of coverage options 176 to a remote device 108 operated by a user.

With continued reference to FIG. 1, computing device 104 may select a coverage plan 188 from a plurality of coverage options 176 by generating a loss function. A "loss function," as used in this disclosure, is an expression of an output of which an optimization algorithm minimizes to generate an optimal result. Selection of different loss functions may result in identification of different elements as generating minimal outputs; for instance, wherein element such as a coverage option having a high deductible is associated in a first loss function with a large coefficient or weight, a coverage option having a small coefficient or weight may minimize the first loss function, whereas a second loss function where a coverage option having a high deductible has a smaller coefficient but degree of variance from a coverage option having a low deductible may produce a minimal output for a different element having a larger coefficient for a coverage option having a lower deductible but more closely hewing to a coverage option having a higher deductible.

With continued reference to FIG. 1, mathematical expression and/or loss function may be generated using a machine learning to produce loss function: i.e., regression. Mathematical expression and/or loss function be user-specific, using a training set composed of previous entries; which may be updated continuously. Mathematical expression and/or loss function may initially be seeded using one or more elements as described above. User may enter a new command changing mathematical expression, and then subsequent user selections may be used to generate a new training set to modify the new expression.

With continued reference to FIG. 1, mathematical expression and/or loss function may be generated using machine learning using a multi-user training set. Training set may be created using data of a cohort of persons having similar demographic, religious, health, lifestyle characteristics, behavior patterns, and/or effective age 124. This may alternatively or additionally be used to seed a mathematical expression and/or loss function for a user, which may be modified by further machine learning and/or regression using subsequent selection of elements. Computing device 104 minimizes a loss function and selects a coverage plan 188 from a plurality of coverage options 176 as a function of minimizing a loss function.

Still referring to FIG. 1, mathematical expression and/or loss function may be provided by receiving one or more user commands. For instance, and without limitation, a graphical user interface 136 may be provided to user with a set of sliders or other user inputs permitting a user to indicate relative and/or absolute importance of each variable containing a user entry ranking to the user. A "coverage variable," as used in this disclosure, is any user preference and/or user input regarding a coverage option. A user preference may indicate a user's desire to have a coverage option that includes a large deductible and smaller monthly payments. In yet another non-limiting example, a user preference may indicate a user's desire to have a car insurance plan that covers accident forgiveness versus a car insurance plan that raises rates after a car accident. Sliders or other inputs may be initialized prior to user entry as equal or may be set to default values based on results of any machine-learning processes or combinations thereof as described in further detail below.

With continued reference to FIG. 1, computing device 104 is configured to minimize a loss function and select a coverage plan from a plurality of coverage options 176 as a function of minimizing the loss function. In an embodiment, a selected coverage plan 188 may be displayed on graphical user interface 136 located on computing device 104 and/or transmitted to a remote device 108.

With continued reference to FIG. 1, computing device 104 may select a coverage plan 188 from a plurality of coverage options 176 by receiving selector training data 184. "Selector training data 184," as used in this disclosure, is training data that contains a plurality of data entries containing a plurality of biological extraction 116 and a plurality of correlated coverage options 176. Computing device 104 generates a selector machine-learning model 192 utilizing the selector training data 184. A "selector machine-learning model," as used in this disclosure, is a machine-learning model that utilizes a biological extraction 116 as an input and outputs a selected coverage plan 188. Generating a selector machine-learning model 192 may include performing a series of one or more calculations, algorithms, and/or equations. Computing device 104 selects a coverage plan 188 from a plurality of coverage options 176 as a function of generating a selector machine-learning model 192.

Figure 2:
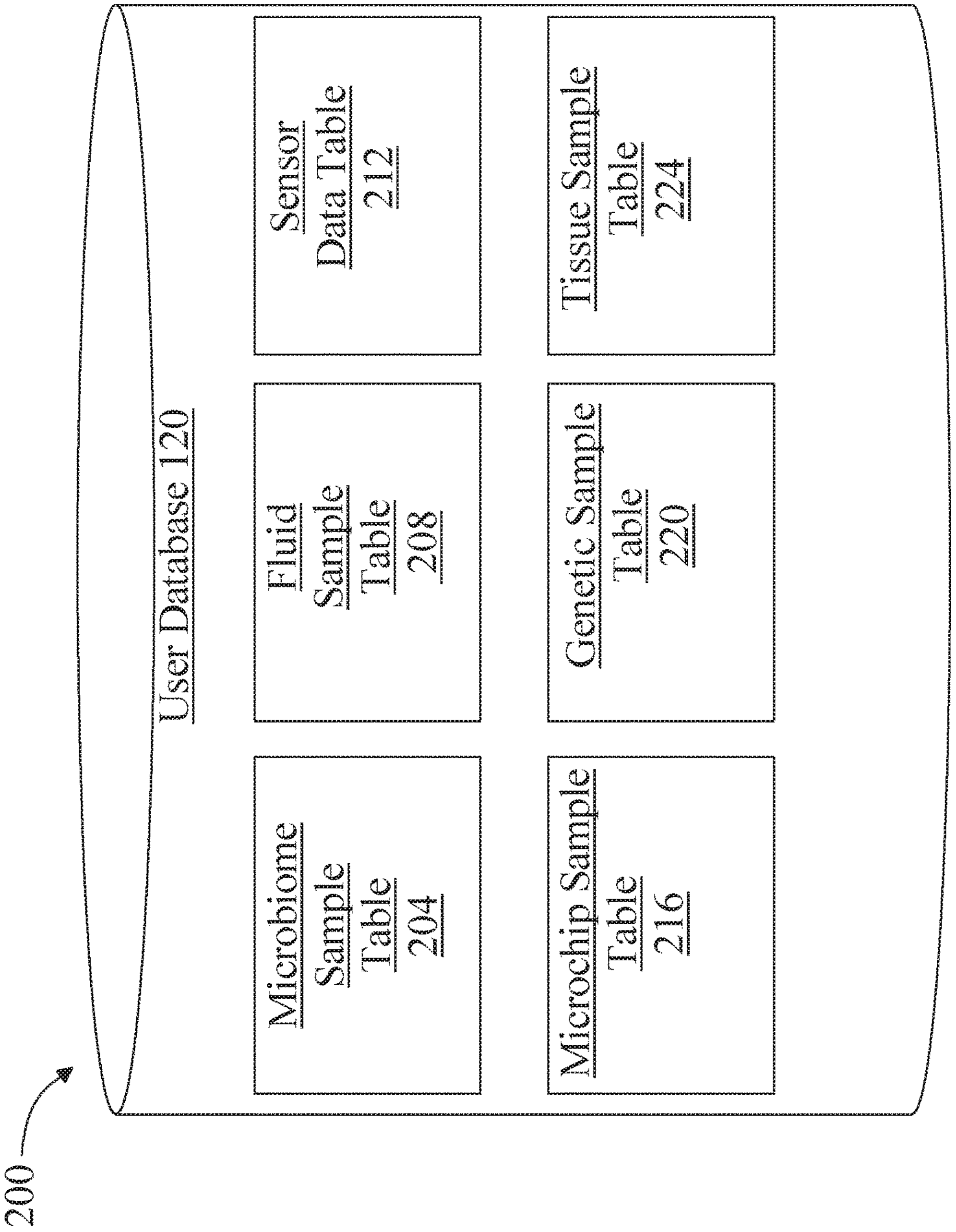
FIG. 2 is a block diagram illustrating an exemplary embodiment of a user database.

Referring now to FIG. 2, an exemplary embodiment of user database 120 is illustrated. User database 120 may be implemented as any data structure as described above in more detail. One or more tables contained within user database 120 may include microbiome sample table 204; microbiome sample table 204 may include one or more biological extractions 116 relating to the microbiome. For instance and without limitation, microbiome sample table 204 may include a physically extracted sample such as a stool sample analyzed for the presence of pathogenic species such as parasites and anaerobes. One or more tables contained within user database 120 may include fluid sample table 208; fluid sample table 208 may include one or more biological extractions 116 containing fluid samples. For instance and without limitation, fluid sample table 208 may include a urine sample analyzed for the presence or absence of glucose. One or more tables contained within user database 120 may include sensor data table 212; sensor data table 212 may include one or more biological extractions 116 containing sensor measurements. For instance and without limitation, sensor data table 212 may include heart rate, blood pressure, and glucose readings. One or more tables contained within user database 120 may include microchip sample table 216; microchip sample table 216 may include one or more biological extractions 116 obtained from a microchip. For instance and without limitation, microchip sample table 216 may include an intracellular nutrient level obtained from a microchip embedded under a user's skin. One or more tables contained within user database 120 may include genetic sample table 220; genetic sample table 220 may include one or more biological extractions 116 containing genetic samples. For instance and without limitation, genetic sample table 220 may include a blood test analyzed for the apolipoprotein E4 variant (APOE4). One or more tables contained within user database 120 may include tissue sample table 224; tissue sample table 224 may include one or more biological extractions 116 containing tissue samples. For instance and without limitation, tissue sample table 224 may include a bone marrow biopsy used to diagnosis leukemia.

Figure 3:
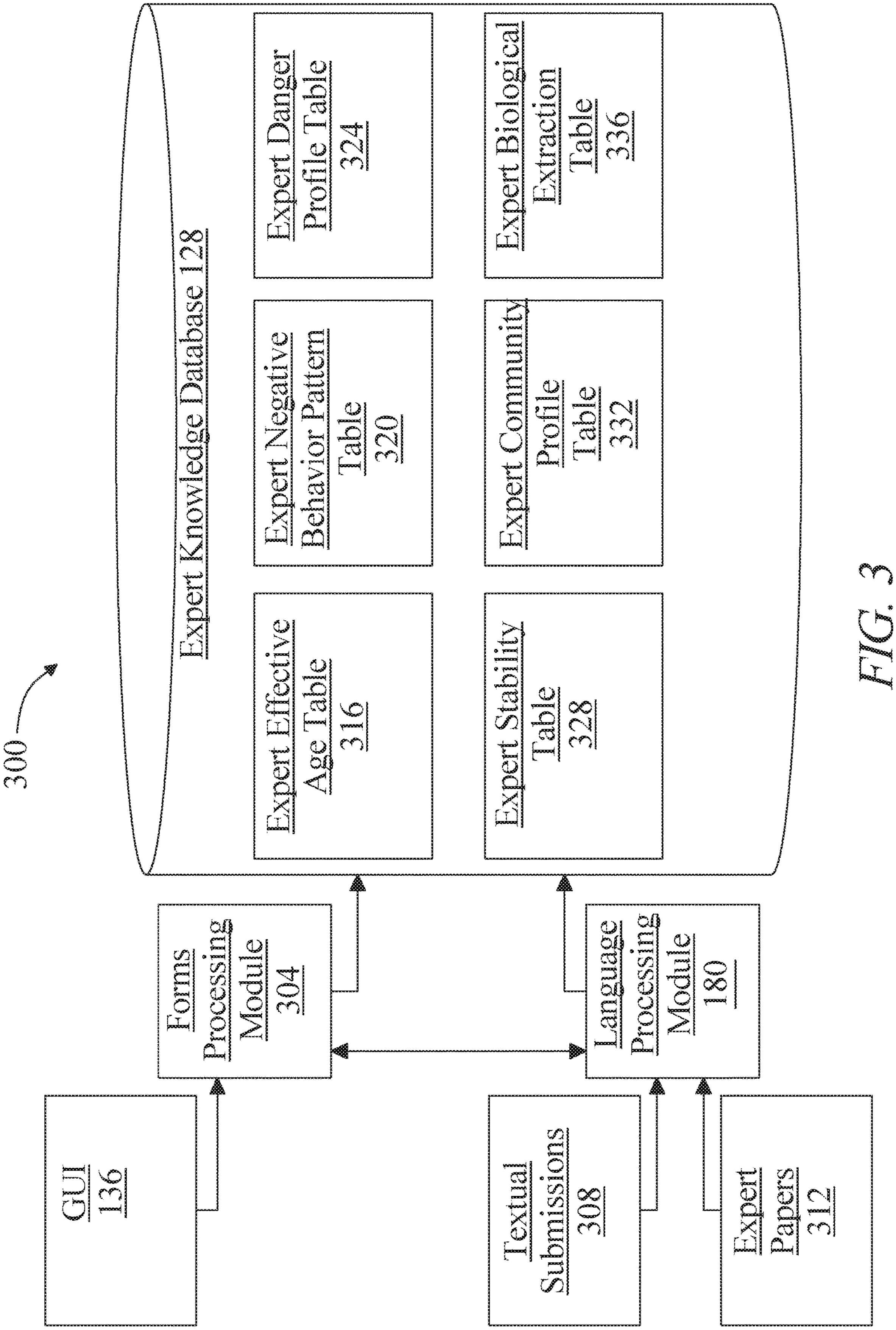
FIG. 3 is a block diagram illustrating an exemplary embodiment of an expert knowledge database.

Referring now to FIG. 3, an exemplary embodiment 300 of expert knowledge database 128 is illustrated. Expert knowledge database 128 may be implemented as any data structure suitable for use as user database 120 as described above in reference to FIG. 1. One or more database tables may be linked to one another by, for instance, common column values. For instance, a common column between two tables of expert knowledge database 128 may include an identifier of an expert submission, such as a form entry, textual submission, expert paper, or the like, for instance as defined below; as a result, a query may be able to retrieve all rows from any table pertaining to a given submission or set thereof. Other columns may include any other category usable for organization or subdivision of expert data, including types of expert data, names and/or identifiers of experts submitting the data, times of submission, or the like; persons skilled in the art, upon reviewing the entirety of this disclosure With continued reference to FIG. 3, expert knowledge database 128 includes a forms processing module 304 that may sort data entered in a submission via graphical user interface 136 by, for instance, sorting data from entries in the graphical user interface 136 to related categories of data; for instance, data entered in an entry relating in the graphical user interface 136 to effective age 124 may be sorted into variables and/or data structures for storage of effective age 124, while data entered in an entry relating to a danger profile and/or an element thereof may be sorted into data structures for the storage of, respectively, danger profiles. Where data is chosen by an expert from pre-selected entries such as drop-down lists, data may be stored directly; where data is entered in textual form, language processing module 180 may be used to map data to an appropriate existing label, for instance using a vector similarity test or other synonym-sensitive language processing test to map physiological data to an existing label. Alternatively or additionally, when a language processing algorithm, such as vector similarity comparison, indicates that an entry is not a synonym of an existing label, language processing module 180 may indicate that entry should be treated as relating to a new label; this may be determined by, e.g., comparison to a threshold number of cosine similarity and/or other geometric measures of vector similarity of the entered text to a nearest existent label, and determination that a degree of similarity falls below the threshold number and/or a degree of dissimilarity falls above the threshold number. Data from expert textual submissions 308, such as accomplished by filling out a paper or PDF form and/or submitting narrative information, may likewise be processed using language processing module 180. Data may be extracted from expert papers 312, which may include without limitation publications in medical and/or scientific journals, by language processing module 180 via any suitable process as described herein. Persons skilled in the art, upon reviewing the entirety of this disclosure, will be aware of various additional methods whereby novel terms may be separated from already-classified terms and/or synonyms therefore, as consistent with this disclosure.

With continued reference to FIG. 3, one or more tables contained within expert knowledge database 128 may include expert effective age table 316; expert effective age table 316 may include one or more data entries containing expert input regarding effective age 124. One or more tables contained within expert knowledge database 128 may include expert behavior pattern table 320; expert behavior pattern table 320 may include one or more data entries containing expert input regarding behavior patterns. One or more tables contained within expert knowledge database 128 may include expert danger profile table 324; expert danger profile table 324 may include one or more data entries containing expert input regarding danger profiles. One or more tables contained within expert knowledge database 128 may include expert stability table 328; expert stability table 328 may include one or more data entries containing expert input regarding stability profiles. One or more tables contained within expert knowledge database 128 may include expert community profile table 332; expert community profile table 332 may include one or more data entries containing expert input regarding user community profile 168. One or more tables contained within expert knowledge database 128 may include expert biological extraction table 336; expert biological extraction table 336 may include one or more data entries containing expert input regarding biological extraction 116.

Figure 4:
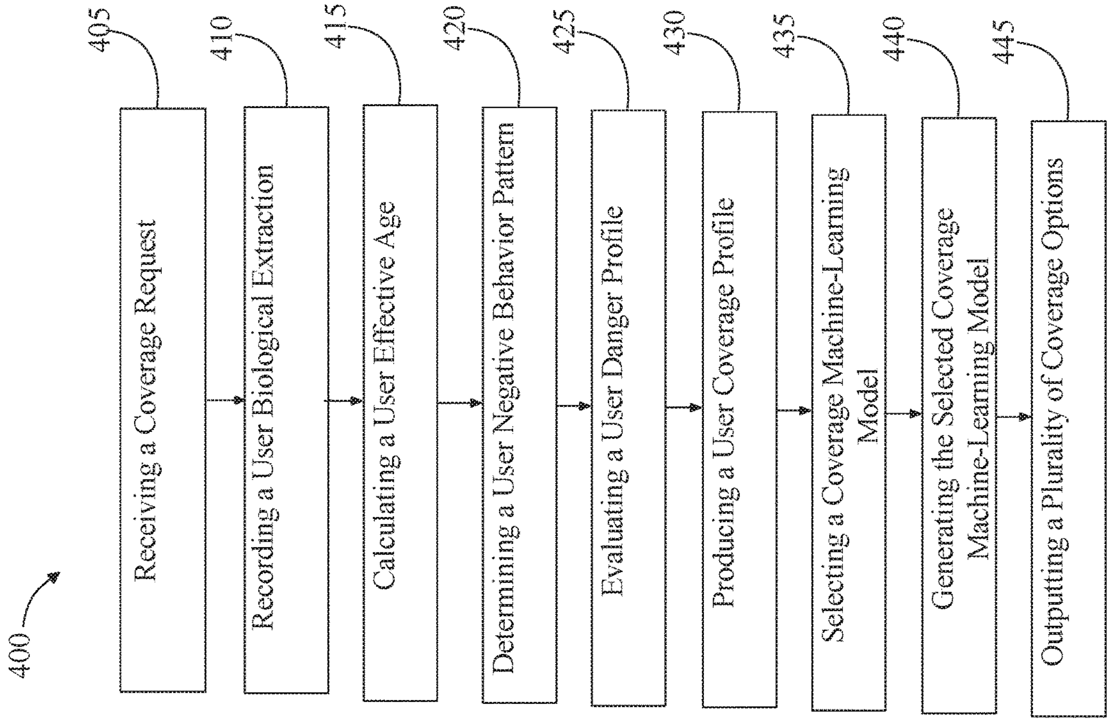
FIG. 4 is a process flow diagram illustrating an exemplary embodiment of a method of making a coverage determination.

Referring now to FIG. 4, an exemplary embodiment of a method 400 of making a coverage determination is illustrated. At step 405, a computing device 104 receives from a remote device 108 a coverage request 112. Remote device 108 includes any of the remote device 108 as described above in reference to FIGS. 1-3. Coverage request 112 includes any of the coverage request 112 as described above in reference to FIGS. 1-3. For instance and without limitation, a coverage request 112 may include a request for a particular category of insurance coverage such as automobile insurance, medical malpractice insurance, life insurance, renter's insurance, and the like.

With continued reference to FIG. 4, at step 410, a computing device 104 records a user biological extraction 116. A biological extraction 116 includes any of the biological extraction 116 as described above in reference to FIGS. 1-3. For instance and without limitation, a biological extraction 116 may include a blood sample analyzed for one or more elements of physiological data including an intracellular level of calcium, an extracellular level of potassium and magnesium, serum testosterone levels, serum estradiol levels, and serum growth hormone levels. In yet another non-limiting example, a biological extraction 116 may include sensor data obtained from a microchip implanted underneath the skin of a user to continuously measure a user's glucose levels. In yet another non-limiting example, a biological extraction 116 may include a stool sample analyzed for nutrient absorption, parasites, viruses, bacteria, and ph.

With continued reference to FIG. 4, at step 415 a computing device 104 calculates a user effective age 124. Effective age 124, includes any of the measurements for effective age 124 as described above in reference to FIG. 1. Effective age 124 may be calculated using a user chronological age and a user biological extraction 116. User chronological age includes any of the chronological age as described above in reference to FIGS. 1-3.

With continued reference to FIG. 4, calculating a user effective age 124 may include multiplying a telomer length factor by an endocrinal factor multiplied by a histone variance factor to produce a positive effective age 124 score. A positive effective age 124 score may include a score that results from positive influences on effective age 124. Computing device 104 add a user behavior pattern and a user danger profile 148 to produce a negative effective age 124 score. A negative effective age 124 score may include a score that results from negative influences on effective age 124. Computing device 104 adjusts a user chronological age to produce a user effective age 124 utilizing a positive effective age 124 score and a negative effective age 124 score. In an embodiment, a positive effective age 124 score may lower an effective age 124 score below a user's actual chronological age, whereas a negative effective age 124 score may raise an effective age 124 score above a user's actual chronological age.

With continued reference to FIG. 4, at step 420, a computing device 104 determines a user behavior pattern 132. A user behavior pattern 132 includes any bad behavior that has an effect on a coverage request 112. For instance and without limitation, a user behavior pattern 132 may include a binge eating disorder or an unhealth pornography addiction. In yet another non-limiting example, a user behavior pattern 132 may include a gambling addiction. In an embodiment, a user behavior pattern 132 may be self-reported by a user or a user's family member, friend, acquaintance, co-worker and the like. In yet another non-limiting example, a user behavior pattern 132 may be identified using one or more machine-learning algorithms. Computing device 104 may receive behavior training data 140. Behavior training data 140 includes a plurality of data entries containing a plurality of biological extraction 116 and a plurality of correlated behavior patterns. Computing device 104 calculates a behavior pattern output utilizing a behavior machine-learning model. Behavior machine-learning model 144 may include any of the machine-learning models as described herein. Behavior machine-learning model 144 utilizes a biological extraction 116 as an input and outputs behavior patterns. Computing device 104 identifies a behavior pattern as a function of calculating a behavior model. For instance and without limitation, a user biological extraction 116 may contains a urine sample that contains neurotransmitters showing elevated levels of dopamine and glutamate. A behavior machine-learning model 144 may be utilized in combination with the user biological extraction 116 and behavior training data 140 to identify a behavior pattern that raises a user's risk of developing a gambling addiction.

With continued reference to FIG. 4, at step 425, a computing device 104 evaluates a user danger profile 148. A user danger profile 148 includes any of the user danger profile 148 as described above in reference to FIGS. 1-3. A user danger profile 148 includes any risky behavior that has an effect on a coverage request 112. In an embodiment, a user danger profile 148 may describe a risky behavior that a user engages in such as biking without a helmet or mountain climbing without oxygen. In an embodiment, a user danger profile 148 may be self-reported such as when a user may self-report to system 100 one or more risky behaviors that the user engages in. In an embodiment, a user danger profile 148 may be reported to system 100 by a family member, friend, spouse, acquaintance, and/or colleague of a user. For example, a friend who frequently goes on scuba diving adventures with a user may report to system 100 that the user engages in risky behavior that includes scuba diving.

With continued reference to FIG. 4, a user danger profile 148 may be identified using danger training data 152 and a machine-learning model. Computing device 104 may receive danger training data 152. Danger training data 152 includes any of the danger training data 152 as described above in reference to FIGS. 1-3. Danger training data 152 includes a plurality of data entries containing a plurality of biological extraction 116 and a plurality of correlated danger profiles. Computing device 104 generates a danger profile output utilizing a danger machine-learning model 156. Danger machine-learning model 156 includes any of the danger machine learning models as described above in reference to FIGS. 1-3. Danger machine-learning model 156 utilizes a biological extraction 116 as an input and outputs danger profiles. Computing device 104 may retrieve one or more biological extraction 116 pertaining to a user from user database 120. Generating danger machine-learning model 156 may include performing a series of one or more calculations, algorithms, and/or equations. Danger machine-learning model 156 may include any of the machine-learning models as described above including for example a supervised machine-learning model, an unsupervised machine-learning model, and/or a lazy-learning model. Computing device 104 selects a danger profile as a function of generating a danger machine-learning model 156.

With continued reference to FIG. 4, at step 430 a computing device 104 produces a user coverage profile 160. User coverage profile 160 includes any of the user coverage profile 160 as described above in reference to FIGS. 1-3. In an embodiment, user coverage profile 160 includes a user biological extraction 116, a user effective age 124, a user behavior pattern 132, and a user danger profile 148. For instance and without limitation, a user coverage profile 160 may include a user biological extraction 116 that contains a urine sample that shows excess dopamine and excess gamma-amino butyric acid (GABA); a user effective age 124 that shows the user's effective age 124 as being 74 as compared to the user's chronological age of 62; a user behavior pattern 132 that shows the user engaging in alcohol six nights each week and also engaging in cardiovascular exercise five days each week; and a user danger profile 148 that shows the user occasionally participates in hang gliding. In an embodiment, a user coverage profile 160 may include a user stability profile 164. A user stability profile 164 includes any of the user stability profile 164 as described above in reference to FIGS. 1-3. For example, a user stability profile 164 may indicate that a user has made consistent mortgage payments over the past three years and that the user lives in an area where the user has access to several parks and open spaces. In an embodiment, a user coverage profile 160 may include a user community profile 168. A user community profile 168 may include any of the user community profile 168 as described above in reference to FIGS. 1-3. For instance and without limitation, a user community profile 168 may describe the user's involvement in a volunteer church group three times each week.

With continued reference to FIG. 4, at step 435, a computing device 104 selects a coverage machine-learning model 172 as a function of a coverage request 112. Computing device 104 may select a coverage machine-learning model 172 using a classification algorithm. Computing device 104 generates a classification algorithm. Classification algorithm includes any of the classification algorithms as described above, including for example, a naïve Bayes classifier, a quadratic classifier, a kernel estimation, a k-nearest neighbor algorithm, a decision tree, a random forest, a neural network, and/or a learning vector quantization. In an embodiment, computing device 104 may perform a series of one or more classification algorithms. Generating a classification algorithm may include performing a series of one or more calculations, algorithms, and/or equations. Computing device 104 utilizes a coverage request 112 and a user biological extraction 116 as an input and outputs a coverage machine-learning model 172. Computing device 104 selects using a classification algorithm a coverage machine-learning model 172.

With continued reference to FIG. 4, selecting a coverage machine-learning model 172 may be performed by computing device 104 utilizing a coverage category. Coverage category includes any of the coverage categories as described above in reference to FIGS. 1-3. For instance and without limitation, coverage category may include a request for automobile insurance, a request for life insurance, a request for health insurance, or a request for long-term care insurance. Computing device 104 extracts from a coverage request 112 a coverage category. Computing device 104 may extract a coverage request 112 utilizing language processing module 180 as described above in reference to FIG. 1. Computing device 104 selects a coverage machine-learning model 172 intended for a coverage category. For example, computing device 104 may extract from a coverage request 112 a coverage category such as flood insurance, and as such, computing device 104 selects a coverage machine-learning model 172 intended for flood insurance. In yet another non-limiting example, computing device 104 may extract from a coverage request 112 a coverage category such as automobile insurance, and as such, computing device 104 selects a coverage machine-learning model 172 intended for automobile insurance. In an embodiment, computing device 104 may select a coverage machine-learning model 172 for a particular coverage category based on expert input such as input contained within expert knowledge database 128.

With continued reference to FIG. 4, at step 440, computing device 104 generates a selected coverage machine-learning model 172. Computing device 104 generates a selected coverage machine-learning model 172 utilizing any of the methodologies as described above in reference to FIGS. 1-3. Generating a selected coverage machine-learning model 172 may include performing a series of one or more calculations, algorithms, and/or equations. Coverage machine-learning model 172 may include any of the machine-learning models as described above, including for example a supervised machine-learning model, an unsupervised machine-learning model, and/or a lazy-learning model.

With continued reference to FIG. 4, at step 445, computing device 104 outputs a plurality of coverage options 176. Computing device 104 outputs a plurality of coverage options 176 as a function of generating a selected coverage machine-learning model 172 and utilizing a user coverage profile 160. Computing device 104 may output a plurality of coverage options 176 by generating a loss function. Loss function includes any of the loss functions as described above in reference to FIG. 1. Computing device 104 generates a loss function utilizing a plurality of output coverage options 176. Computing device 104 minimizes the loss function and selects a coverage plan 188 from a plurality of coverage options 176 as a function of minimizing the loss function. Computing device 104 may minimize a loss function by taking into account one or more coverage variables. Coverage variables include any of the coverage variables as described above in reference to FIG. 1. Coverage variables may include one or more user inputs regarding coverage options 176 and/or coverage request 112. For example, a coverage variable may specify how much money each month that a user is willing to pay for a coverage option. In yet another example, a coverage variable may specify types of coverage a user is seeking, such as a coverage option that has a large deductible and small monthly payments or a small deductible and larger monthly payments. In yet another non-limiting example, a coverage variable may specify certain types of coverage that a user is seeking to obtain such as hurricane insurance that contains both windstorm coverage and sewer backup endorsements. In yet another non-limiting example, a coverage variable may specify a certain dollar amount of coverage that a user seeks to obtain, such as up to $500,000 in coverage. Computing device 104 may receive a coverage variable from a remote device 108 utilizing any network methodology as described herein. Computing device 104 minimizes a loss function utilizing a plurality of coverage options and a coverage variable. Computing device 104 selects a coverage plan from a plurality of coverage options as a function of minimizing a loss function.

With continued reference to FIG. 4, selecting a coverage plan 188 from a plurality of coverage options 176 may include using selector training data 184 and a selector machine-learning model 192. Computing device 104 receives selector training data 184. Selector training data 184 includes any of the selector training data 184 as described above in reference to FIGS. 1-3. Selector training data 184 includes a plurality of data entries containing a plurality of biological extractions 116 and a plurality of correlated coverage options 176. Computing device 104 generates a selector machine-learning model 192. Selector machine-learning model 192 includes any of the selector machine-learning model 192 as described above in reference to FIGS. 1-3. For example, selector machine-learning model 192 may include a supervised machine-learning model, an unsupervised machine-learning model and/or a lazy-learning model. Generating selector machine-learning model 192 may include performing a series of one or more calculations, algorithms, and/or equations. Computing device 104 selects a coverage plan 188 from a plurality of coverage options 176 as a function of generating a selector machine-learning model 192.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
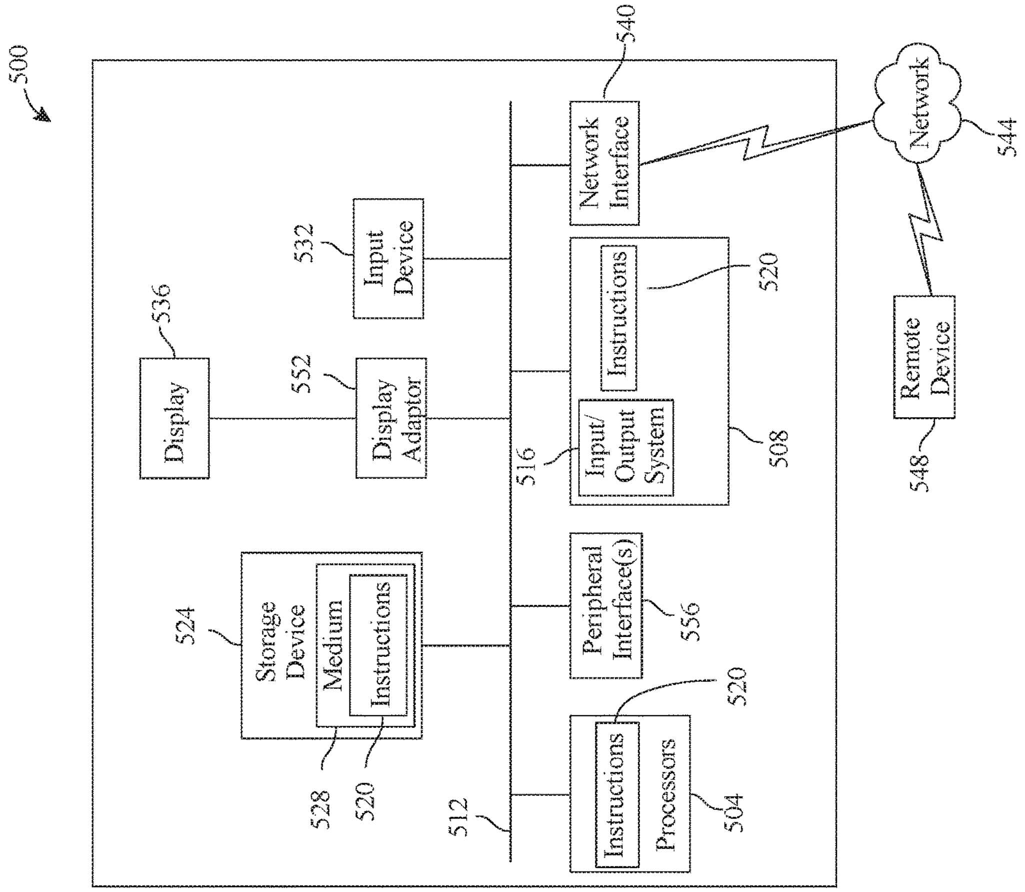
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for making a coverage determination, the system comprising:

a computing device, the computing device designed and configured to:
  receive from a remote device a coverage request;
  record a user biological extraction, wherein;
    the user biological extraction comprises physiological data comprising physiological state data; and
    the recordation comprises a user's tendency for developing at least a disease as a function of the physiological state data,
  calculate a user effective age utilizing a user chronological age and the user's tendency for developing the at least a disease;
  determine, using a trained behavior machine-learning model, a user behavior pattern, wherein determining the user behavior pattern comprises:
    displaying, using a graphical user interface (GUI) and as a function of the user biological extraction, one or more questionnaires to a user;
    receiving a response to the one or more questionnaires from the user; and
    processing the response using the trained behavior machine-learning model to output the behavior pattern as a numerical model inference result;
  identify a user danger profile as a function of the received response;
  produce a user coverage profile wherein the user coverage profile comprises the user biological extraction, the user effective age, the user behavior pattern, and the user danger profile;

select a coverage machine-learning model from a plurality of coverage machine-learning models, wherein each coverage machine-learning model of the plurality of coverage machine-learning models is optimized for a specific coverage type, as a function of the coverage request, wherein the system is further configured to:

extract textual data from the coverage request;

parse the textual data into a plurality of tokens;

generate positive and negative statistical correlations for the plurality of tokens;

classify the plurality of tokens into the at least a coverage category as a function of a category classifier and the statistical correlations; and select the coverage machine-learning model as a function of the at least a coverage category;

generate the selected coverage machine-learning model using an artificial neural network, wherein the coverage machine-learning model comprises an input layer of nodes, at least one intermediate layer, and an output layer of nodes, wherein a connection between the nodes is created, wherein the connections between the nodes in adjacent layers are adjusted to produce desired values at the output nodes, wherein the machine-learning model is iteratively trained by training data, the training data correlating a plurality of biological extractions with a plurality of coverage options, and wherein the coverage machine-learning model utilizes a user coverage profile as an input and outputs a plurality of coverage options;

input, into the selected coverage machine-learning model, the user coverage profile and the coverage request, wherein inputting the user coverage profile and the coverage request into the selected coverage machine-learning model causes the selected coverage machine-learning model to:

combine a structured set of normalized feature values of the user coverage profile with features extracted from the coverage request to generate a unified internal feature representation;

propagate the unified internal feature representation through a plurality of computational layers of the selected coverage machine-learning model to produce an intermediate numerical inference state; and store the intermediate numerical inference state for use in generating model outputs; and output, from the selected coverage machine-learning model, a plurality of coverage options, wherein outputting the plurality of coverage options further comprises:

generating a loss function utilizing the plurality of coverage options, wherein the loss function comprises a plurality of coverage variables;

displaying each coverage variable of the plurality of coverage as a user-adjustable slider on the GUI;

receiving user input that adjusts each slider of the plurality of coverage variables on the GUI;

minimizing the loss function in response to receiving an adjustment of one or more sliders of each slider of the plurality of coverage variables; and selecting a coverage plan from the plurality of coverage options as a function of minimizing the loss function.

2. The system of claim 1, wherein calculating the user effective age further comprises:

calculating a positive effective age score, wherein calculating the positive effective age score further comprises aggregating a telomer length factor, an endocrinal factor, and a histone variance factor;

calculating a negative effective age score, wherein calculating the negative effective age score further comprises aggregating the user behavior pattern to the user danger profile; and adjusting a user chronological age to produce a user effective age utilizing the positive effective age score and the negative effective age score.

3. The system of claim 1, wherein determining the user behavior pattern further comprises:

generating a behavior machine-learning model utilizing behavior training data wherein the behavior machine-learning model utilizes a biological extraction as an input and outputs behavior patterns; and calculating a behavior pattern output utilizing the behavior machine-learning model;

identifying the behavior pattern as a function of calculating the behavior output.

4. The system of claim 1, wherein the computing device is further configured to identify the user danger profile, wherein identifying the user danger profile comprises:

generating a danger machine-learning model utilizing danger training data wherein the danger training data further comprises a plurality of data entries containing a plurality of biological extractions and a plurality of correlated danger profiles;

calculating a danger profile output utilizing a danger machine-learning model wherein the danger machine-learning model utilizes a biological extraction as an input and outputs danger profiles; and selecting a danger profile as a function of generating the danger machine-learning model.

5. The system of claim 1, wherein producing the user coverage profile further comprises identifying a user stability profile and a user community profile.

6. The system of claim 1, wherein selecting the coverage model further comprises:

generating a classification algorithm wherein the classification algorithm utilizes coverage requests and user biological extractions as inputs and outputs coverage machine-learning models; and selecting, using the classification algorithm, a coverage machine-learning model.

7. The system of claim 1, wherein selecting the coverage model further comprises:

extracting from the coverage request a coverage category; and selecting the coverage machine-learning model intended for the coverage category.

8. The system of claim 1, wherein generating the loss function further comprises:

receiving from the remote device a coverage variable pertaining to the coverage request; and minimizing the loss function as a function of the plurality of coverage options and the coverage variable.

9. A method of making a coverage determination, the method comprising:

receiving, by a computing device, a coverage request from a remote device;

recording, by the computing device, a user biological extraction, wherein:

the user biological extraction comprises physiological data comprising physiological state data; and the recordation comprises a user's tendency for developing at least a disease as a function of the physiological state;

calculating, by the computing device, a user effective age utilizing a user chronological age and the user's tendency for developing the at least a disease;

determining, by the computing device and using a trained behavior machine-learning model, a user behavior pattern, wherein determining the user behavior pattern comprises:

displaying, using a graphical user interface (GUI) and as a function of the user biological extraction, one or more questionnaires to a user;

receiving, by the computing device, a response to the one or more questionnaires from the user; and processing the response using the trained behavior machine-learning model to output the behavior pattern as a numerical model inference result;

identifying by the computing device a user danger profile as a function of the received response;

producing, by the computing device, a user coverage profile wherein the user coverage profile comprises the user biological extraction, the user effective age, the user behavior pattern, and the user danger profile;

selecting, by the computing device, a coverage machine-learning model from a plurality of coverage machine-learning models, wherein each coverage machine-learning model of the plurality of coverage machine-learning models is optimized for a specific coverage type, as a function of the coverage request, wherein the method is further configured to:

extract textual data from the coverage request;

parse the textual data into a plurality of tokens;

generate positive and negative statistical correlations for the plurality of tokens;

classify the plurality of tokens into at least a coverage category as a function of a category classifier and the statistical correlations; and select the coverage machine-learning model as a function of the at least a coverage category;

generating, by the computing device, the selected coverage machine-learning model using an artificial neural network, wherein the coverage machine-learning model comprises an input layer of nodes, at least one intermediate layer, and an output layer of nodes, wherein a connection between the nodes is created, wherein the connections between the nodes in adjacent layers are adjusted to produce desired values at the output nodes, wherein the machine-learning model is iteratively trained by training data, the training data correlating a plurality of biological extractions with a plurality of coverage options, and wherein the coverage machine-learning model utilizes a user coverage profile as an input and outputs a plurality of coverage options;

inputting into the selected coverage machine-learning model, using the computing device, the user coverage profile and the coverage request, wherein inputting the user coverage profile and the coverage request into the selected coverage machine-learning model causes the selected coverage machine-learning model to:

combine a structured set of normalized feature values of the user coverage profile with features extracted from the coverage request to generate a unified internal feature representation;

propagate the unified internal feature representation through a plurality of computational layers of the selected coverage machine-learning model to produce an intermediate numerical inference state; and store the intermediate numerical inference state for use in generating model outputs; and outputting, by the computing device and from the selected coverage machine-learning model, a plurality of coverage options, wherein outputting the plurality of coverage options further comprises:

generating a loss function utilizing the plurality of coverage options, wherein the loss function comprises a plurality of coverage variables;

displaying each coverage variable of the plurality of coverage as a user-adjustable slider on the GUI;

receiving user input that adjusts each slider of the plurality of coverage variables on the GUI;

minimizing the loss function in response to receiving an adjustment of one or more sliders of each slider of the plurality of coverage variables; and selecting a coverage plan from the plurality of coverage options as a function of minimizing the loss function.

10. The method of claim 9, wherein calculating the user effective age further comprises:

calculating a positive effective age score, wherein calculating the positive effective age score further comprises aggregating a telomer length factor, an endocrinal factor, and a histone variance factor;

calculating a negative effective age score, wherein calculating the negative effective age score further comprises aggregating the user behavior pattern to the user danger profile; and adjusting a user chronological age to produce a user effective age utilizing the positive effective age score and the negative effective age score.

11. The method of claim 9, wherein determining the user behavior pattern further comprises:

generating a behavior machine-learning model utilizing behavior training data wherein the behavior training data contains a plurality of data entries containing a plurality of biological extractions and a plurality of correlated behavior patterns;

calculating a behavior pattern output utilizing the behavior machine-learning model wherein the behavior machine-learning model utilizes a biological extraction as an input and outputs behavior patterns; and identifying the behavior pattern as a function of calculating the behavior output.

12. The method of claim 9, wherein the method further comprises identifying, by the computing device, the user danger profile, wherein identifying the user danger profile comprises:

generating a danger machine-learning model utilizing danger training data wherein the danger training data further comprises a plurality of data entries containing a plurality of biological extractions and a plurality of correlated danger profiles;

calculating a danger profile output utilizing a danger machine-learning model wherein the danger machine-learning model utilizes a biological extraction as an input and outputs danger profiles; and selecting a danger profile as a function of generating the danger machine-learning model.

13. The method of claim 9, wherein producing the user coverage profile further comprises identifying a user stability profile and a user community profile.

14. The method of claim 9, wherein selecting the coverage model further comprises:

generating a classification algorithm wherein the classification algorithm utilizes coverage requests and user biological extractions as inputs and outputs coverage machine-learning models; and selecting, using the classification algorithm, a coverage machine-learning model.

15. The method of claim 9, wherein selecting the coverage model further comprises:

extracting from the coverage request a coverage category; and selecting the coverage machine-learning model intended for the coverage category.

16. The method of claim 9, wherein generating the loss function further comprises:

receiving from the remote device a coverage variable pertaining to the coverage request; and minimizing the loss function as a function of the plurality of coverage options and the coverage variable.

* * * * *